US010767907B2

(12) United States Patent
Carter et al.

(10) Patent No.: US 10,767,907 B2
(45) Date of Patent: Sep. 8, 2020

(54) CONDENSER EVAPORATOR SYSTEM WITH A SUBCOOLER FOR REFRIGERATION SYSTEMS

(71) Applicant: Johnson Controls Technology Company, Plymouth, MI (US)

(72) Inventors: Thomas P. Carter, Olney, MD (US); Bruce L. Griffith, Waynesboro, PA (US)

(73) Assignee: Johnson Controls Technology Company, Auburn Hills, MI (US)

( * ) Notice: Subject to any disclaimer, the term of this patent is extended or adjusted under 35 U.S.C. 154(b) by 258 days.

(21) Appl. No.: 15/486,847

(22) Filed: Apr. 13, 2017

(65) Prior Publication Data

US 2017/0299229 A1    Oct. 19, 2017

Related U.S. Application Data

(60) Provisional application No. 62/324,209, filed on Apr. 18, 2016, provisional application No. 62/415,338, filed on Oct. 31, 2016.

(51) Int. Cl.
*F25B 40/02* (2006.01)
*F25B 5/02* (2006.01)
(Continued)

(52) U.S. Cl.
CPC ............... *F25B 5/02* (2013.01); *F25B 6/02* (2013.01); *F25B 40/02* (2013.01); *F25B 41/003* (2013.01);
(Continued)

(58) Field of Classification Search
CPC .......... F25B 40/02; F25B 41/003; F25B 5/02
See application file for complete search history.

(56) References Cited

U.S. PATENT DOCUMENTS

| 2,434,593 A | 1/1948 | Schulz et al. |
| 2,876,629 A | 3/1959 | Dube et al. |
| (Continued) | | |

FOREIGN PATENT DOCUMENTS

| CN | 103797315 | 5/2014 |
| CN | 103884125 | 6/2014 |
| (Continued) | | |

OTHER PUBLICATIONS

John, "Refrigeration Plant" 2014, Full Document (Year: 2014).*
(Continued)

*Primary Examiner* — Elizabeth J Martin
*Assistant Examiner* — Nael N Babaa
(74) *Attorney, Agent, or Firm* — Foley & Lardner LLP

(57) ABSTRACT

A decentralized condenser evaporator system includes a condenser system, a controlled pressure receiver, a subcooler system, and an evaporator system. The condenser system is positioned to receive a compressed gaseous refrigerant from a centralized compressor system. The condenser system is configured to condense the compressed gaseous refrigerant into a liquid refrigerant. The controlled pressure receiver is positioned to receive and store the liquid refrigerant. The subcooler system is positioned to receive the liquid refrigerant from the controlled pressure receiver. The subcooler system is configured to sub-cool the liquid refrigerant into a sub-cooled liquid refrigerant. The evaporator system is positioned to receive the sub-cooled liquid refrigerant from the subcooler system. The evaporator system is configured to facilitate providing a cooling operation to a cooling zone through evaporation of the sub-cooled liquid refrigerant flowing through the evaporator system into an evaporated gaseous refrigerant which is returned to the centralized compressor system.

16 Claims, 20 Drawing Sheets

(51) Int. Cl.
*F25B 49/02* (2006.01)
*F25B 47/02* (2006.01)
*F25B 41/00* (2006.01)
*F25B 6/02* (2006.01)
*F25B 41/04* (2006.01)

(52) U.S. Cl.
CPC .............. *F25B 41/04* (2013.01); *F25B 47/02* (2013.01); *F25B 47/022* (2013.01); *F25B 49/02* (2013.01); *F25B 2400/06* (2013.01); *F25B 2400/13* (2013.01); *F25B 2400/16* (2013.01); *F25B 2400/21* (2013.01); *F25B 2600/05* (2013.01); *F25B 2600/112* (2013.01); *F25B 2600/2523* (2013.01); *F25B 2700/04* (2013.01); *Y02B 30/743* (2013.01)

(56) References Cited

U.S. PATENT DOCUMENTS

| | | | |
|---|---|---|---|
| 3,070,974 | A | 1/1963 | Greenwald |
| 3,435,626 | A | 4/1969 | Wile et al. |
| 3,680,324 | A | 8/1972 | Garland |
| 3,766,745 | A | 10/1973 | Quick |
| 4,209,996 | A | 7/1980 | Shaw |
| 4,240,266 | A | 12/1980 | Scrine et al. |
| 4,681,297 | A | 7/1987 | Mertz |
| 5,031,690 | A | 7/1991 | Anderson et al. |
| 5,056,327 | A | 10/1991 | Lammert |
| 5,392,612 | A | 2/1995 | Alsenz |
| 5,444,987 | A | 8/1995 | Alsenz |
| 5,694,782 | A | 12/1997 | Alsenz |
| 6,018,958 | A | 2/2000 | Lingelbach et al. |
| 6,038,875 | A | 3/2000 | Haselden |
| 6,381,972 | B1 | 5/2002 | Cotter |
| 6,490,877 | B2 | 12/2002 | Bash et al. |
| 7,152,426 | B1 | 12/2006 | Cowans |
| 7,895,854 | B2 | 3/2011 | Bash et al. |
| 8,544,283 | B2 | 10/2013 | Lingelbach et al. |
| 9,316,424 | B2 | 4/2016 | Lin et al. |
| 9,845,981 | B2 | 12/2017 | Lu et al. |
| 9,939,185 | B2 | 4/2018 | Sunderland et al. |
| 10,024,582 | B2 | 7/2018 | Carter |
| 2005/0198977 | A1 | 9/2005 | Carlin et al. |
| 2010/0094434 | A1 | 4/2010 | Ballet et al. |
| 2010/0107659 | A1 | 5/2010 | Hildreth, Jr. |
| 2012/0055185 | A1* | 3/2012 | Luo ............... F25B 6/02 62/222 |
| 2012/0312033 | A1 | 12/2012 | Lingelbach et al. |
| 2012/0312038 | A1 | 12/2012 | Lingelbach et al. |
| 2013/0098085 | A1 | 4/2013 | Judge et al. |
| 2013/0098086 | A1 | 4/2013 | Sillato et al. |
| 2013/0327503 | A1* | 12/2013 | Koch ............... F25B 39/00 165/104.21 |
| 2014/0033753 | A1 | 2/2014 | Lu et al. |
| 2014/0157801 | A1 | 6/2014 | Lingelbach et al. |
| 2015/0143826 | A1 | 5/2015 | Lingelbach |
| 2016/0231040 | A1 | 8/2016 | Hellmann |
| 2018/0080695 | A1 | 3/2018 | West |
| 2019/0353408 | A1 | 11/2019 | Zaynulin et al. |

FOREIGN PATENT DOCUMENTS

| | | |
|---|---|---|
| CN | 205048778 | 2/2016 |
| DE | 10 2014 100 917 | 7/2015 |
| DE | 102014100917 A1 * | 7/2015 |
| WO | WO-2015/110634 | 7/2015 |

OTHER PUBLICATIONS

U.S. Appl. No. 15/486,847, filed Apr. 13, 2017, Johnson Controls Technology Company.
Search Report for International Application No. PCT/US2017/027436, dated Jul. 6, 2017, 13 pages.
Search Report for International Application No. PCT/US2017/027465, dated Jul. 6, 2017, 14 pages.
U.S. Notice of Allowance on U.S. Appl. No. 15/646,988 dated May 3, 2018. 6 pages.
U.S. Notice of Allowance on U.S. Appl. No. 15/646,988 dated Mar. 29, 2018. 10 pages.
Office Action for U.S. Appl. No. 15/646,988, dated Nov. 17, 2017, 19 pages.
Chinese Office Action dated Mar. 9, 2020 in Chinese Application No. 201780023458.0.
Chinese Office Action dated Mar. 9, 2020 in Chinese Application No. 201780023864.7.

* cited by examiner

CONDENSER EVAPORATOR SYSTEM WITH A SUBCOOLER FOR REFRIGERATION SYSTEMS

CROSS-REFERENCE TO RELATED PATENT APPLICATIONS

This application claims the benefit of U.S. Provisional Patent Application No. 62/324,209, filed Apr. 18, 2016, and U.S. Provisional Patent Application No. 62/415,338, filed Oct. 31, 2016, both of which are incorporated herein by reference in their entireties.

BACKGROUND

The present invention relates generally to a refrigeration system and more particularly to a refrigeration system having one or more decentralized condenser evaporator systems and the control thereof.

Refrigeration utilizes the thermodynamic property of evaporation to remove heat from a process. When a refrigerant is evaporated in a heat exchanger (i.e., an evaporator), a heating medium that is in contact with the heat exchanger (e.g., air, water, glycol) transfers heat from itself through the heat exchanger and is absorbed by the refrigerant, resulting in the refrigerant changing from a liquid state to a gaseous state. Once the refrigerant is in a gaseous state, the heat thereof must be rejected by compressing the gaseous refrigerant to a high pressure state and then passing the gaseous refrigerant through a second heat exchanger (i.e., condenser) where heat is removed from the gaseous refrigerant by a cooling medium, resulting in condensing the gaseous refrigerant back to a liquid refrigerant. The liquid refrigerant is then ready to be used again as a refrigerant for absorbing heat.

SUMMARY

One exemplary embodiment relates to a decentralized condenser evaporator system fluidly coupled to a centralized compressor system. The decentralized condenser evaporator system includes a condenser system, a controlled pressure receiver, a subcooler system, and an evaporator system. The condenser system is positioned to receive a compressed gaseous refrigerant from the centralized compressor system. The condenser system is configured to condense the compressed gaseous refrigerant into a liquid refrigerant. The controlled pressure receiver is positioned to receive and store the liquid refrigerant condensed by the condenser system. The subcooler system is positioned to receive the liquid refrigerant from the controlled pressure receiver. The subcooler system is configured to sub-cool the liquid refrigerant exiting the controlled pressure receiver into a sub-cooled liquid refrigerant. The evaporator system is positioned to receive the sub-cooled liquid refrigerant from the subcooler system. The evaporator system is configured to facilitate providing a cooling operation to a cooling zone associated with the evaporator system through evaporation of the sub-cooled liquid refrigerant flowing through the evaporator system into an evaporated gaseous refrigerant which is returned to the centralized compressor system.

Another exemplary embodiment relates to a refrigeration system. The refrigeration system includes a centralized compressor system and a plurality of decentralized condenser evaporator systems fluidly coupled to the centralized compressor system. The centralized compressor system is configured to compress an evaporated gaseous refrigerant into a compressed gaseous refrigerant. Each of the plurality of decentralized condenser evaporator systems is associated with a respective cooling zone. Each of the plurality of decentralized condenser evaporator systems includes a condenser system, a controlled pressure receiver, a subcooler system, and an evaporator system. The condenser system is positioned to receive the compressed gaseous refrigerant from the centralized compressor system. The condenser system is configured to condense the compressed gaseous refrigerant into a liquid refrigerant. The controlled pressure receiver is positioned to receive and store the liquid refrigerant condensed by the condenser system. The subcooler system is positioned to receive the liquid refrigerant from the controlled pressure receiver. The subcooler system is configured to sub-cool the liquid refrigerant exiting the controlled pressure receiver into a sub-cooled liquid refrigerant. The evaporator system is positioned to receive the sub-cooled liquid refrigerant from the subcooler system. The evaporator system is configured to facilitate providing a cooling operation to the respective cooling zone associated with the evaporator system through evaporation of the sub-cooled liquid refrigerant flowing through the evaporator system into the evaporated gaseous refrigerant.

Still another exemplary embodiment relates to a decentralized condenser evaporator system fluidly coupled to a centralized compressor system. The decentralized condenser evaporator system includes a condenser system, a controlled pressure receiver, a subcooler system, an evaporator system, and a controller. The condenser system is positioned to receive a compressed gaseous refrigerant from the centralized compressor system. The condenser system is configured to condense the compressed gaseous refrigerant into a liquid refrigerant. The controlled pressure receiver is positioned to receive and store the liquid refrigerant condensed by the condenser system. The subcooler system is positioned to receive the liquid refrigerant from the controlled pressure receiver. The subcooler system is configured to sub-cool the liquid refrigerant exiting the controlled pressure receiver into a sub-cooled liquid refrigerant. The evaporator system is positioned to receive the sub-cooled liquid refrigerant from the subcooler system. The evaporator system is configured to facilitate providing a cooling operation to a cooling zone associated with the evaporator system through evaporation of the sub-cooled liquid refrigerant flowing through the evaporator system into an evaporated gaseous refrigerant. The controller is configured to operate the subcooler system in an active mode while the evaporator system is operating in a cooling mode and in an inactive mode while the evaporator system is not operating in the cooling mode.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Figure 1:
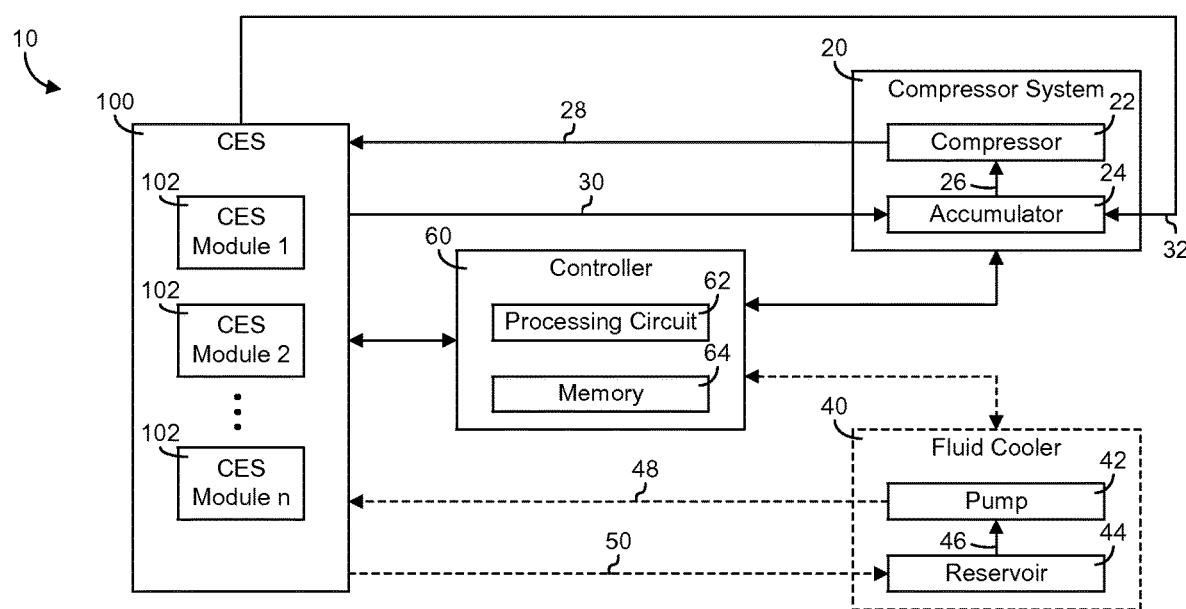
FIG. 1 is schematic diagram of a refrigeration system including a compressor system and a decentralized condenser evaporator system, according to an exemplary embodiment.

Following below are more detailed descriptions of various concepts related to, and implementations of, methods, apparatuses, and systems for control of a refrigeration system having a decentralized condenser evaporator system. The various concepts introduced above and discussed in greater detail below may be implemented in any of numerous ways, as the described concepts are not limited to any particular manner of implementation. Examples of specific implementations and applications are provided primarily for illustrative purposes. It should also be understood that the terminology is for the purpose of description only and should not be regarded as limiting.

According to an exemplary embodiment, the systems, apparatuses, and methods disclosed herein relate to refrigeration systems having one or more decentralized condenser evaporator systems and the control thereof. Each condenser evaporator system may include a condenser system, a controlled pressure receiver, a subcooler system, and/or one or more evaporator systems. Each condenser evaporator system may be fluidly coupled to a remote compressor system that provides a pressurized, gaseous refrigerant to the condenser system thereof. A stage of the condenser system may be selectively controlled (e.g., adjusted, modulated, increased, decreased; by controlling a condenser fan; by controlling fluid flow to a condenser; by controlling a fluid cooler; etc.) to condense a desired amount of the gaseous refrigerant to a liquid refrigerant which is then directed to and stored within the controlled pressure receiver. Each evaporator system may be fluidly coupled to the controlled pressure receiver to receive the liquid refrigerant. The subcooler system may be positioned downstream of the controlled pressure receiver and upstream of each of the evaporator systems. The subcooler system may be configured to maintain the liquid refrigerant received by the controlled pressure receiver and provided to the evaporators in a liquid state (e.g., prevents the liquid refrigerant from flashing into a gaseous state in response to a pressure drop between the controlled pressure receiver and expansion valves of the evaporator systems, etc.). A stage of the evaporator systems may be selectively controlled (e.g., adjusted, modulated, increased, decreased; by controlling an evaporator fan; by controlling an evaporator expansion valve; etc.) to evaporate the liquid refrigerant to a gaseous refrigerant to facilitate providing a cooling operation to air within a zone associated with the evaporator system (e.g., a refrigerated area, etc.).

The condenser evaporator systems of the present disclosure may provide various advantages over traditional condenser evaporator systems. According to an exemplary embodiment, the condenser evaporator system is configured to facilitate maintaining an operating liquid refrigerant level in the controlled pressure receiver within a liquid refrigerant operating range by modulating at least one of the stage of the condenser system and the stage of the evaporator system to control the flow of refrigerant into and out of the controlled pressure receiver (e.g., under all load conditions, etc.). Modulating the stages of the condenser system and/or the evaporator system may allow for an increased balance between the refrigerant flows going into and out of the controlled pressure receiver while minimizing open and/or closed operation of feed valves (e.g., a high side supply valve, a low side suction valve, a hot gas condensing valve, etc.) between the condenser evaporator system and the compressor system. Such continuous and stable flow between the condenser evaporator systems and the compressor system facilitates controlling the capacities of the condenser system and the evaporator system of each condenser evaporator system to assure a balanced, average liquid level in all active controlled pressure receivers, while maintaining a minimum system condensing pressure, thereby increasing the efficiency of the compressor system and the refrigeration system as a whole.

According to the exemplary embodiment shown in FIGS. 1-6, 18, and 19, a thermal regulation system, shown as refrigeration system 10, includes a compressor system, shown as compressor system 20, a controller, shown as controller 60, and a condenser evaporator system (CES), shown as CES 100, having one or more modules, shown as CES modules 102. In some embodiments, the refrigeration system 10 additionally includes a central fluid cooler system, shown as fluid cooler 40. According to an exemplary embodiment, the CES modules 102 each include a condenser system, a refrigerant reservoir, and one or more evaporator systems that allow the CES 100 and the CES modules 102 to be decentralized (e.g., rather than the refrigeration system 10 including a large, centralized condenser system and liquid refrigerant reservoirs, etc.). According to an exemplary embodiment, the CES 100 allows for a reduction of an amount of the refrigerant (e.g., by 85% or more, etc.) within the refrigeration system 10 relative to traditional, centralized system.

As shown in FIG. 1, the compressor system 20 includes a refrigerant reservoir, shown as compressor accumulator 24, fluidly coupled to a compressor device, shown as compressor 22, via a conduit, shown as compressor conduit 26. According to an exemplary embodiment, the compressor 22 is configured to receive a gaseous refrigerant from the compressor accumulator 24 through the compressor conduit 26 and compress the gaseous refrigerant to increase the pressure and temperature thereof. As shown in FIG. 1, the compressor 22 is fluidly coupled to the CES modules 102 of the CES 100 via a conduit, shown as hot gas (HG) refrigerant conduit 28, such that the compressor 22 may provide the compressed gaseous refrigerant to each respective CES module 102, as necessary. In some embodiments, the compressor 22 includes a single stage compressor. In other embodiments, the compressor 22 includes a multi-stage compressor. In some embodiments, the compressor system 20 includes a plurality of compressors 22 (e.g., a first, lower stage compressor; a second, higher stage compressor; etc.).

As shown in FIG. 1, the compressor accumulator 24 is fluidly coupled to the CES modules 102 of the CES 100 via a first conduit, shown as high side suction (HSS) conduit 30, and a second conduit, shown as low side suction (LSS) conduit 32. According to an exemplary embodiment, the compressor accumulator 24 is configured to receive a gaseous refrigerant from the CES modules 102. By way of example, a first flow of gaseous refrigerant may be received by the compressor accumulator 24 from the CES modules 102 (e.g., from controlled pressure receivers of the CES modules 102, etc.) through the HSS conduit 30 and a second flow of gaseous refrigerant may be received by the compressor accumulator 24 from the CES modules 102 (e.g., from evaporator systems of the CES modules 102, etc.) though the LSS conduit 32. The compressor accumulator 24 may be configured to prevent liquid refrigerant from entering the compressor 22 by separating any liquid refrigerant from the gaseous refrigerant received via the HSS conduit 30 and the LSS conduit 32. The compressor accumulator 24 may then provide the separated gaseous refrigerant to the compressor 22 via the compressor conduit 26 for compression and delivery to the CES 100 (as described above).

As shown in FIG. 1, the fluid cooler 40 includes a working fluid reservoir, shown as cooler reservoir 44, fluidly coupled to a pump device, shown as cooler pump 42, via a conduit, shown as cooler supply conduit 46. According to an exemplary embodiment, the cooler pump 42 is configured to receive a liquid working fluid (e.g., a liquid refrigerant, liquid glycol, etc.) from the cooler reservoir 44 through the cooler supply conduit 46 and pump the liquid working fluid to the CES 100. As shown in FIG. 1, the cooler pump 42 is fluidly coupled to the CES modules 102 of the CES 100 via a conduit, shown as cooling conduit 48, such that the cooler pump 42 may provide the liquid working fluid to each respective CES module 102 (e.g., a CES module 102 that has a plate/frame condenser, a shell and tube condenser, a shell and plate condenser, etc.), as necessary.

As shown in FIG. 1, the cooler reservoir 44 is fluidly coupled to the CES modules 102 of the CES 100 via a conduit, shown as cooler return conduit 50. According to an exemplary embodiment, the cooler reservoir 44 is configured to receive gaseous and/or liquid working fluid from the CES modules 102 (e.g., from condenser systems of the CES modules 102, etc.). By way of example, a flow of gaseous and/or liquid working fluid may enter the cooler reservoir 44 from the CES modules 102 through cooler return conduit 50. According to an exemplary embodiment, the fluid cooler 40 additionally includes a cooling element (e.g., a condenser, a heat exchanger, a thermoelectric cooler, a fan element, within the cooler reservoir 44, etc.) configured to condense the gaseous working fluid to a liquid state and/or reduce the temperature of the liquid working fluid received from the CES modules 102 via the cooler return conduit 50. The cooler reservoir 44 may then provide the cooled, liquid working fluid to the cooler pump 42 via the cooler supply conduit 46 for delivery to the CES 100 (as described above).

Figure 2:
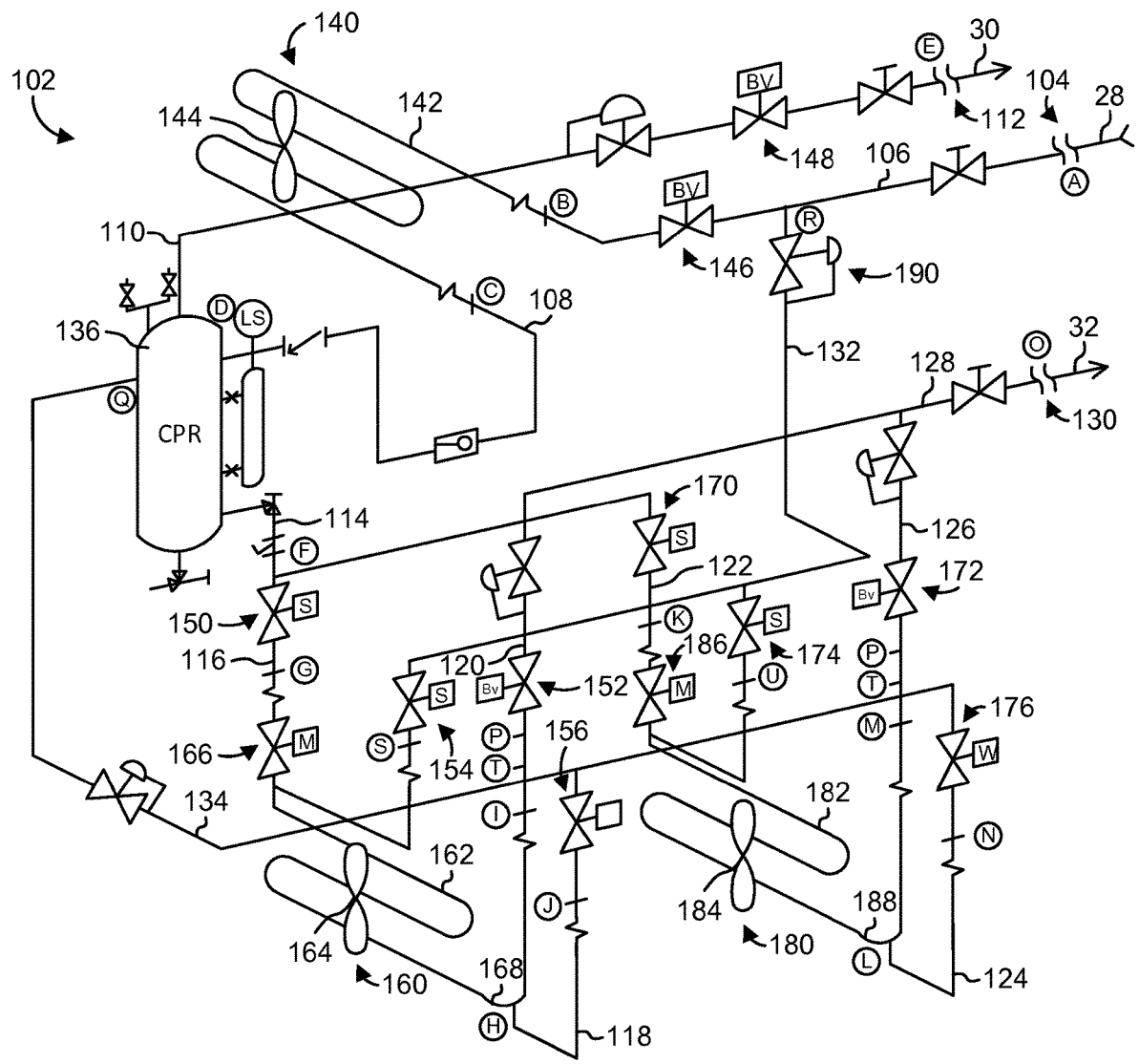
FIG. 2 is a schematic diagram of a module of the decentralized condenser evaporator system of FIG. 1, according to an exemplary embodiment.

As shown in FIG. 2, the CES module 102 includes a controlled pressure receiver (CPR), shown as CPR 136, a first heat exchanger, shown as condenser system 140, a second heat exchanger, shown as first evaporator system 160, and a third heat exchanger, shown as second evaporator system 180. In other embodiments, the CES module 102 does not include one of the first evaporator system 160 and the second evaporator system 180. In still other embodiments, the CES module 102 includes additional evaporator systems (e.g., a third, fourth, fifth, etc. evaporator system). As shown in FIG. 2, the CES module 102 includes an inlet conduit, shown as condenser inlet conduit 106, that extends from an inlet of the CES module 102 (at point A), shown as HG refrigerant inlet 104, to an inlet of the condenser system 140 (at point B). The HG refrigerant inlet 104 is positioned to receive the compressed gaseous refrigerant from the compressor 22 via the HG refrigerant conduit 28 such that the condenser inlet conduit 106 provides the compressed gaseous refrigerant from the compressor 22 to the condenser system 140. As shown in FIG. 2, the condenser inlet conduit 106 includes a first inlet valve, shown as HG condensing valve 146, positioned to facilitate modulating the flow of the compressed gaseous refrigerant provided by the compressor 22 entering the condenser system 140.

As shown in FIG. 2, the condenser system 140 includes a conduit, shown as condenser conduit 142, that extends from the inlet of the condenser system 140 (at point B) to an outlet of the condenser system 140 (at point C). The condenser system 140 also includes a variable speed drive fan, shown as condenser fan 144. According to the exemplary embodiment shown in FIG. 2, the condenser system 140 includes an adiabatic condenser, an air-cooled condenser, an evaporative condenser (e.g., may additionally include a spray water pump, etc.), and/or still another type of condenser that utilizes the condenser fan 144. A speed setpoint of the condenser fan 144 may be controlled to facilitate selectively adjusting the stage of the condenser system 140 and thereby the capacity of the condenser system 140 to condense at least a portion of the compressed gaseous refrigerant provided by the compressor 22 into a liquid refrigerant.

According to an alternative embodiment, the condenser system 140 includes a plate frame condenser, a shell and tube condenser, a shell and plate condenser, or still another condenser that does not include the condenser fan 144 (e.g., the condenser system 140 does not include the condenser fan 144, etc.). In such an embodiment, the condenser system 140 is fluidly coupled to the fluid cooler 40 to receive the cooled working fluid from the cooler pump 42. A flow rate of the cooled working fluid provided by the cooler pump 42 may be controlled to facilitate selectively adjusting the stage of the condenser system 140 and thereby the capacity of the condenser system 140 to condense at least a portion of the compressed gaseous refrigerant provided by the compressor 22 into a liquid refrigerant. In some embodiments, the CES 100 includes at least one of (i) one or more CES modules 102 including a condenser system 140 having an adiabatic condenser, an air-cooled condenser, an evaporative condenser, etc. and (ii) one or more CES modules 102 including a condenser system 140 having a plate frame condenser, a shell and tube condenser, a shell and plate condenser, etc.

As shown in FIG. 2, the CES module 102 includes a first intermediate conduit, shown as condenser outlet conduit 108, that extends from the outlet of the condenser conduit 142 (at point C) to a first inlet of the CPR 136 (at point D). The condenser outlet conduit 108 is positioned to provide the condensed liquid refrigerant from the condenser system 140 to the CPR 136. The CPR 136 is configured store the liquid refrigerant received from the condenser system 140. As the condensed liquid refrigerant is delivered to the CPR 136, it may pass through a float valve where upon passing therethrough, a portion of the condensed liquid refrigerant may flash into a vapor (e.g., due to a pressure change from the condenser system 140 to the CPR 136, etc.). As shown in FIG. 2, the CES module 102 includes a first outlet conduit, shown as CPR HSS conduit 110, that extends from a first outlet of the CPR 136 (near point D) to a first outlet of the CES module 102 (at point E), shown as HSS outlet 112. The HSS outlet 112 is positioned to provide gaseous refrigerant from the CPR 136 (e.g., that flashed into a vapor state after passing through the float valve, etc.) via the CPR HSS conduit 110 to the HSS conduit 30 such that the CPR 136 may provide gaseous refrigerant to the compressor accumulator 24. As shown in FIG. 2, the CPR HSS conduit 110 includes a first outlet valve, shown as HSS valve 148, positioned to selectively restrict the flow of the gaseous refrigerant provided by the CPR 136 to the compressor accumulator 24.

As shown in FIG. 2, the CES module 102 includes a second intermediate conduit, shown as CPR outlet conduit 114, that extends from a second outlet of the CPR 136 and splits (at point F) to fluidly couple the CPR 136 to the first evaporator system 160 via a first evaporator inlet conduit, shown as first evaporator inlet conduit 116, and the second evaporator system 180 via a second evaporator inlet conduit, shown as second evaporator inlet conduit 122. The first evaporator inlet conduit 116 extends from the CPR outlet conduit 114 (at point F) to an inlet of the first evaporator system 160 (at point G). The first evaporator system 160 may thereby receive liquid refrigerant from the CPR 136. As shown in FIG. 2, the first evaporator inlet conduit 116 includes a first evaporator inlet valve, shown as first evaporator inlet valve 150, positioned to selectively control the flow of the liquid refrigerant from the CPR 136 into the first evaporator system 160. The second evaporator inlet conduit 122 extends from the CPR outlet conduit 114 (at point F) to an inlet of the second evaporator system 180 (at point K). The second evaporator system 180 may thereby receive liquid refrigerant from the CPR 136. As shown in FIG. 2, the second evaporator inlet conduit 122 includes a second evaporator inlet valve, shown as second evaporator inlet valve 170, positioned to selectively control the flow of the liquid refrigerant from the CPR 136 into the second evaporator system 180.

As shown in FIG. 2, the first evaporator system 160 includes a conduit, shown as first evaporator conduit 162, that extends from the inlet of the first evaporator system 160 (at point G) to an outlet of the first evaporator system 160 (at point I). The first evaporator system 160 additionally includes a first expansion valve, shown as first evaporator expansion valve 166, positioned along the first evaporator conduit 162. According to an exemplary embodiment, the first evaporator expansion valve 166 is positioned to facilitate modulating an amount of liquid refrigerant that flows into the first evaporator system 160 (e.g., based on a superheat setpoint of the first evaporator expansion valve 166, etc.). A superheat setpoint of the first evaporator expansion valve 166 may be selectively set to facilitate at least partially selectively adjusting the stage of the first evaporator system 160 and thereby the capacity of the first evaporator system 160 to evaporate at least a portion of the liquid refrigerant provided by the CPR 136 into a gaseous refrigerant. The first evaporator system 160 also includes a variable speed drive fan, shown as first evaporator fan 164. A speed setpoint of the first evaporator fan 164 may be variably controlled to facilitate at least partially selectively adjusting the stage of the first evaporator system 160 and thereby the capacity of the first evaporator system 160 to evaporate at least a portion of the liquid refrigerant provided by the CPR 136 into a gaseous refrigerant. According to an exemplary embodiment, the air that is blown over the first evaporator conduit 162 by the first evaporator fan 164 facilitates providing a cooling operation to an area or zone (e.g., a refrigerated zone, etc.) associated with the first evaporator system 160 through the evaporation of the liquid refrigerant flowing therethrough, which thereby cools the air.

As shown in FIG. 2, the CES module 102 includes a third intermediate conduit, shown as first evaporator outlet conduit 120, positioned to fluidly couple the outlet of the first evaporator conduit 162 (at point I) to a second outlet conduit, shown as evaporator LSS conduit 128. The first evaporator outlet conduit 120 is positioned to provide the evaporated gaseous refrigerant from the first evaporator system 160 to the evaporator LSS conduit 128. As shown in FIG. 2, the first evaporator outlet conduit 120 includes a first evaporator outlet valve, shown as first evaporator outlet valve 152, positioned to selectively control the flow of the evaporated gaseous refrigerant from the first evaporator system 160 to the evaporator LSS conduit 128.

As shown in FIG. 2, the second evaporator system 180 includes a conduit, shown as second evaporator conduit 182, that extends from the inlet of the second evaporator system 180 (at point K) to an outlet of the second evaporator system 180 (at point M). The second evaporator system 180 additionally includes a second expansion valve, shown as second evaporator expansion valve 186, positioned along the second evaporator conduit 182. According to an exemplary embodiment, the second evaporator expansion valve 186 is positioned to facilitate modulating an amount of liquid refrigerant that flows into the second evaporator system 180 (e.g., based on a superheat setpoint of the second evaporator expansion valve 186, etc.). A superheat setpoint of the second evaporator expansion valve 186 may be selectively set to facilitate at least partially selectively adjusting the stage of the second evaporator system 180 and thereby the capacity of the second evaporator system 180 to evaporate at least a portion of the liquid refrigerant provided by the CPR 136 into a gaseous refrigerant. The second evaporator system 180 also includes a variable speed drive fan, shown as second evaporator fan 184. A speed setpoint of the second evaporator fan 184 may be variably controlled to facilitate at least partially selectively adjusting the stage of the second evaporator system 180 and thereby the capacity of the second evaporator system 180 to evaporate at least a portion of the liquid refrigerant provided by the CPR 136 into a gaseous refrigerant. According to an exemplary embodiment, the air that is blown over the second evaporator conduit 182 by the second evaporator fan 184 facilitates providing a cooling operation to an area or zone (e.g., a refrigerated zone, etc.) associated with the second evaporator system 180 through the evaporation of the liquid refrigerant flowing therethrough, which thereby cools the air.

As shown in FIG. 2, the CES module 102 includes a fourth intermediate conduit, shown as second evaporator outlet conduit 126, positioned to fluidly couple the outlet of the second evaporator conduit 182 (at point M) to the evaporator LSS conduit 128. The second evaporator outlet conduit 126 is positioned to provide the evaporated gaseous refrigerant from the second evaporator system 180 to the evaporator LSS conduit 128. As shown in FIG. 2, the second evaporator outlet conduit 126 includes a second evaporator outlet valve, shown as second evaporator outlet valve 172, positioned to selectively control the flow of the evaporated gaseous refrigerant from the second evaporator system 180 to the evaporator LSS conduit 128.

As shown in FIG. 2, the evaporator LSS conduit 128 fluidly couples the first evaporator system 160 and the second evaporator system 180 to a second outlet of the CES module 102 (at point O), shown as LSS outlet 130. The LSS outlet 130 is positioned to provide gaseous refrigerant from the first evaporator system 160 and/or the second evaporator system 180 to the LSS conduit 32 via the evaporator LSS conduit 128. Thus, the first evaporator system 160 and/or the second evaporator system 180 may provide gaseous refrigerant to the compressor accumulator 24.

As shown in FIG. 2, the first evaporator system 160 includes a first liquid trap, shown as first evaporator liquid trap 168, positioned along the first evaporator conduit 162 (at point H). The first evaporator system 160 includes a return line, shown as first evaporator return conduit 118, that extends from the first evaporator liquid trap 168 (at point H) to a secondary outlet of the first evaporator system 160 (at point J). The first evaporator return conduit 118 is positioned to fluidly couple the first evaporator liquid trap 168 of the first evaporator conduit 162 (at point H) to a CPR return line (at point J), shown as CPR return conduit 134. According to an exemplary embodiment, the first evaporator liquid trap 168 is configured to convey liquid and gaseous condensate refrigerant created during a hot gas defrost cycle within the first evaporator system 160. The first evaporator return conduit 118 and the CPR return conduit 134 may thereby direct the defrost condensate refrigerant of the first evaporator system 160 to a second inlet of the CPR 136 (at point Q). As shown in FIG. 2, the CPR return conduit 134 includes a first defrost valve, shown as first evaporator outlet defrost valve 156, positioned to selectively control the flow of the liquid refrigerant from the first evaporator liquid trap 168 that is returned to the CPR 136 along the CPR return conduit 134.

As shown in FIG. 2, the second evaporator system 180 includes a second liquid trap, shown as second evaporator liquid trap 188, positioned along the second evaporator conduit 182 (at point L). The second evaporator system 180 includes a return line, shown as second evaporator return conduit 124, that extends from the second evaporator liquid trap 188 (at point L) to a secondary outlet of the second evaporator system 180 (at point N). The second evaporator return conduit 124 is positioned to fluidly couple the second evaporator liquid trap 188 of the second evaporator conduit 182 (at point L) to the CPR return conduit 134 (at point N). According to an exemplary embodiment, the second evaporator liquid trap 188 is configured to convey liquid and gaseous condensate refrigerant created during the defrost cycle within the second evaporator system 180. The second evaporator return conduit 124 and the CPR return conduit 134 may thereby direct defrost condensate refrigerant (e.g., during a defrost mode, etc.) of the second evaporator system 180 to the second inlet of the CPR 136 (at point Q). As shown in FIG. 2, the CPR return conduit 134 includes a second defrost valve, shown as second evaporator outlet defrost valve 176, positioned to selectively control the flow of the defrost condensate refrigerant from the second evaporator liquid trap 188 that is returned to the CPR 136 along the CPR return conduit 134.

Figure 6:
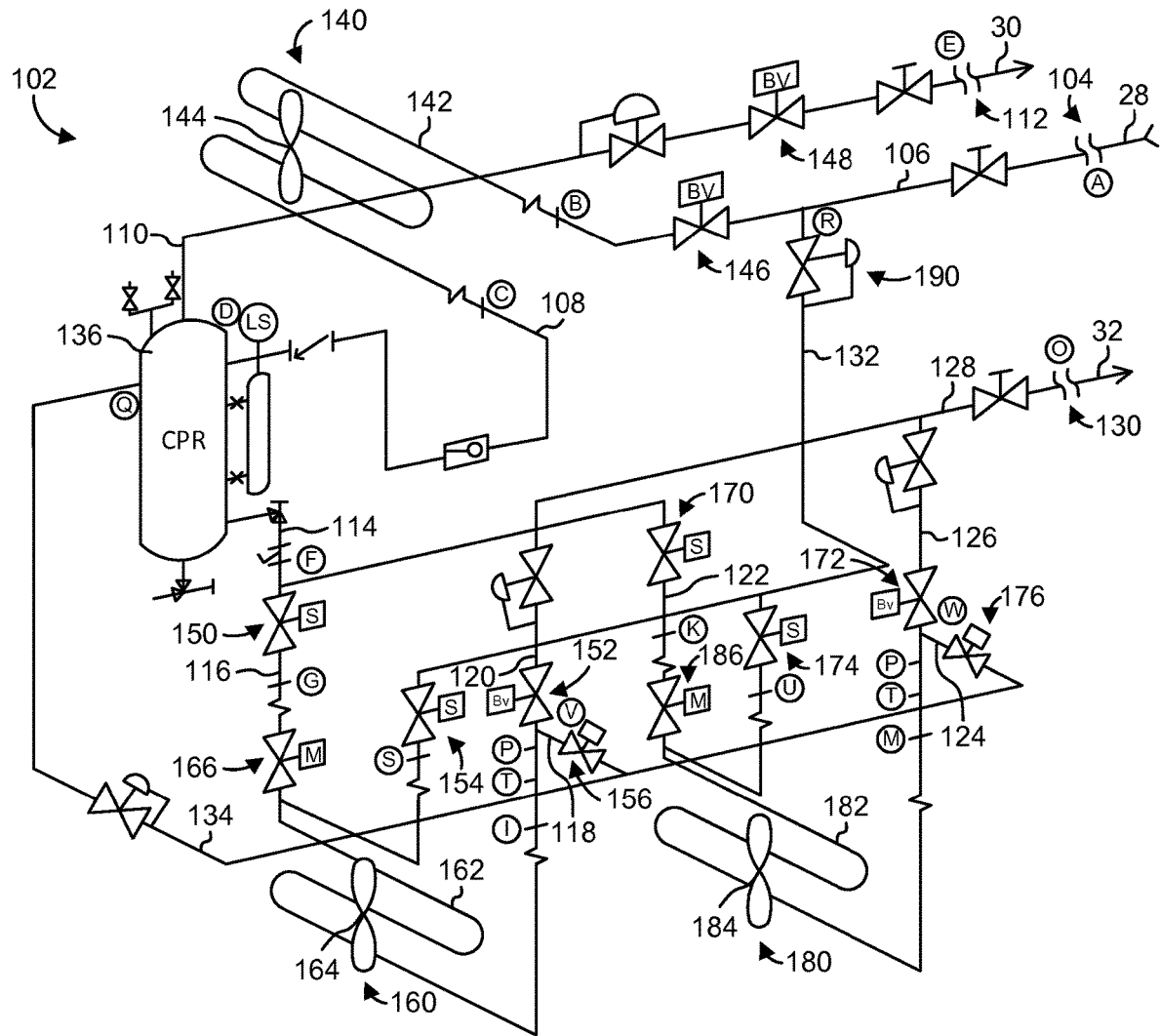
FIG. 6 is a schematic diagram of a module of the decentralized condenser evaporator system of FIG. 1, according to another exemplary embodiment.

As shown in FIG. 6, the CES module 102 does not include the first evaporator liquid trap 168 or the second evaporator liquid trap 188. Rather, the CPR return conduit 134 is positioned to directly fluidly couple the first evaporator outlet conduit 120 (at point V) and the second evaporator outlet conduit 126 (at point W). The CPR return conduit 134 may thereby be positioned to directly receive the refrigerant flowing out of the first evaporator system 160 and/or the second evaporator system 180 (e.g., during a defrost mode of operation, etc.). By way of example, during a defrost mode, a combination of liquid condensate refrigerant and uncondensed gaseous refrigerant may travel through the first evaporator outlet defrost valve 156 and/or the second evaporator outlet defrost valve 176 to the CPR return conduit 134 (e.g., since the first evaporator outlet valve 152 and/or the second evaporator outlet valve 172 may be closed, etc.).

As shown in FIG. 2, the CES module 102 includes a defrost conduit, shown as defrost conduit 132, that extends from the condenser inlet conduit 106 (at point R) to a secondary inlet of the first evaporator system 160 (at point S) and to a secondary inlet of the second evaporator system 180 (at point U). The defrost conduit 132 is positioned to direct the compressed gaseous refrigerant from the compressor 22 to the first evaporator system 160 and the second evaporator system 180. As shown in FIG. 2, the defrost conduit 132 includes a defrost valve, shown as HG defrost pressure regulator 190, positioned to facilitate selectively controlling characteristics of the flow of the compressed gaseous refrigerant from the compressor 22 into the defrost conduit 132 (e.g., the pressure, flow rate, etc. thereof).

As shown in FIG. 2, the defrost conduit 132 includes a first inlet defrost valve, shown as first evaporator inlet defrost valve 154, positioned to facilitate controlling the flow of the compressed gaseous refrigerant provided by the compressor 22 entering the secondary inlet of the first evaporator system 160. As shown in FIG. 2, the defrost conduit 132 includes a second inlet defrost valve, shown as second evaporator inlet defrost valve 174, positioned to facilitate controlling the flow of the compressed gaseous refrigerant provided by the compressor 22 entering the secondary inlet of the second evaporator system 180. According to an exemplary embodiment, the defrost conduit 132, the HG defrost pressure regulator 190, the first evaporator inlet defrost valve 154, the second evaporator inlet defrost valve 174, the first evaporator outlet defrost valve 156, and/or the second evaporator outlet defrost valve 176 are configured to facilitate operating the first evaporator system 160 and/or the second evaporator system 180 in a defrost mode.

Figure 18:
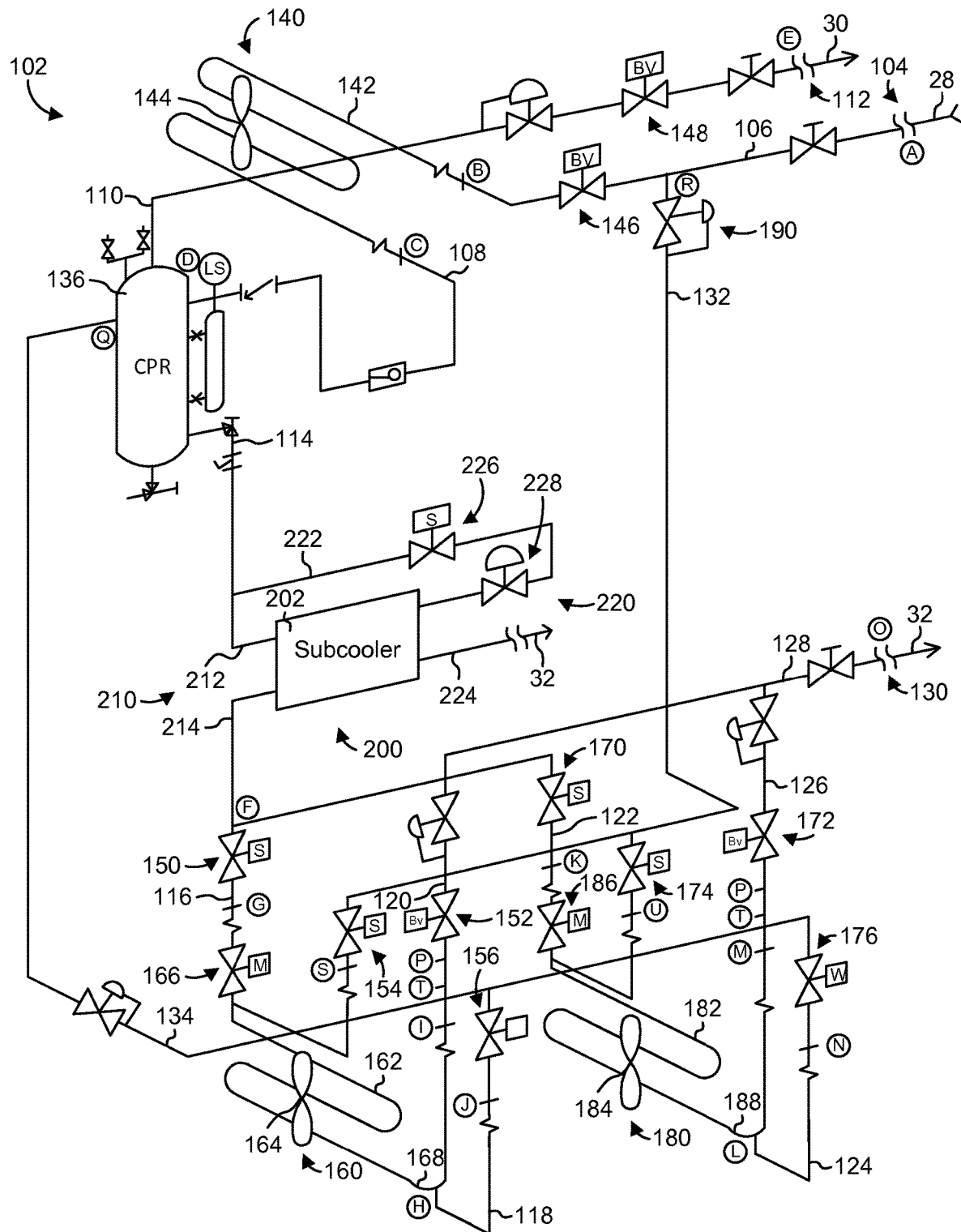
FIG. 18 is a schematic diagram of a module of the decentralized condenser evaporator system of FIG. 1 including a subcooler system, according to an exemplary embodiment.
Figure 19:
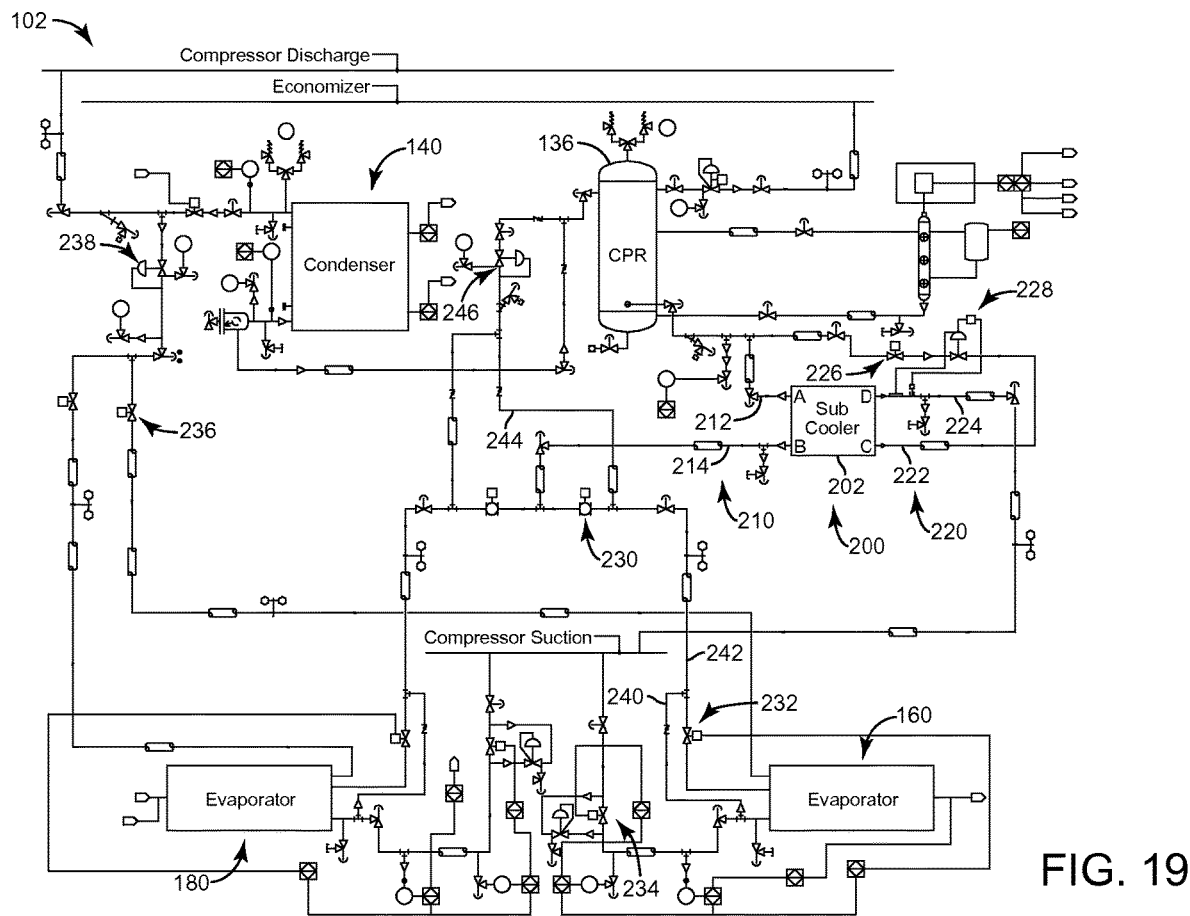
FIG. 19 is a schematic diagram of a module of a decentralized condenser evaporator system including a subcooler system, according to an exemplary embodiment.

According to the exemplary embodiment shown in FIGS. 18 and 19, the CES module 102 may additionally include a decentralized subcooler system (e.g., a liquid refrigerant subcooler, etc.), shown as subcooler system 200. As shown in FIGS. 18 and 19, the subcooler system 200 is positioned along the CPR outlet conduit 114, proximate the CPR 136 (e.g., near the CPR 136, at the outlet of the CPR 136, etc.). The subcooler system 200 may thereby be positioned downstream of the CPR 136 and upstream of the first evaporator inlet conduit 116 (i.e., the first evaporator system 160) and the second evaporator inlet conduit 122 (i.e., the second evaporator system 180). According to an exemplary embodiment, the subcooler system 200 is configured to further lower the temperature (e.g., sub-cool, etc.) of the refrigerant exiting the CPR 136 through the CPR outlet conduit 114 such that the exiting refrigerant is provided to the first evaporator expansion valve 166 of the first evaporator system 160 and the second evaporator expansion valve 186 of the second evaporator system 180 in a liquid state (e.g., a consistent or constant liquid column is provided thereto, not in a gaseous state, etc.).

By way of example, the liquid refrigerant exiting the CPR 136 through the CPR outlet conduit 114 may experience a pressure drop between (i) the CPR 136 and (ii) the first evaporator expansion valve 166 and/or the second evaporator expansion valve 186 such that at least a portion of the liquid refrigerant flashes (e.g., vaporizes, etc.) into a gaseous state. For example, every 1% of liquid refrigerant that flashes into a gaseous state may increase the volume of the refrigerant by a factor of two. According to an exemplary embodiment, the first evaporator expansion valve 166 and the second evaporator expansion valve 186 are configured as constant volume flow devices. Therefore, the first evaporator expansion valve 166 and the second evaporator expansion valve 186 may not receive a desired amount of refrigerant mass flow if the liquid refrigerant flashes. The subcooler system 200 is thereby positioned to sub-cool the liquid and/or gaseous refrigerant received from the CPR 136 via the CPR outlet conduit 114 such that a constant liquid column (e.g., liquid refrigerant supply, etc.) is provided to the first evaporator expansion valve 166 and/or the second evaporator expansion valve 186. Such a consistent supply of liquid refrigerant to the first evaporator expansion valve 166 and/or the second evaporator expansion valve 186 may facilitate more consistent and efficient operation of the first evaporator system 160, the second evaporator system 180, the CES module 102, and the refrigeration system 10 as a whole.

As shown in FIGS. 18 and 19, the subcooler system 200 includes a thermal regulation unit (e.g., a heat exchanger, etc.), shown as subcooler 202, a first circuit, shown as refrigerant circuit 210, and a second circuit, shown as cooling circuit 220. According to an exemplary embodiment, the refrigerant circuit 210 is configured to receive a first portion of the liquid refrigerant exiting the CPR 136 and the cooling circuit 220 is configured to receive a second portion of the liquid refrigerant exiting the CPR 136. As shown in FIGS. 18 and 19, the refrigerant circuit 210 includes a first inlet conduit, shown as refrigerant inlet conduit 212, and a first outlet conduit, shown as refrigerant outlet conduit 214. The refrigerant inlet conduit 212 is positioned to couple to the CPR outlet conduit 114 to a first inlet (e.g., a refrigerant inlet, etc.) of the subcooler 202. The refrigerant outlet conduit 214 is positioned to couple a first outlet (e.g., a refrigerant outlet, etc.) of the subcooler 202 to the first evaporator system 160 and the second evaporator system 180 (i.e., the first evaporator expansion valve 166 and the second evaporator expansion valve 186).

As shown in FIGS. 18 and 19, the cooling circuit 220 includes a second inlet conduit, shown as working fluid inlet conduit 222, a second outlet conduit, shown as working fluid outlet conduit 224, a first valve (e.g., a solenoid valve, etc.), shown as subcooler valve 226, and a second valve, shown as subcooler expansion valve 228. The working fluid inlet conduit 222 is positioned to couple to the CPR outlet conduit 114 to a second inlet (e.g., a working fluid inlet, etc.) of the subcooler 202. The working fluid outlet conduit 224 is positioned to couple a second outlet (e.g., a working fluid outlet, etc.) of the subcooler 202 to the LSS conduit 32 of the compressor system 20.

As shown in FIGS. 18 and 19, the subcooler valve 226 is positioned along the working fluid inlet conduit 222. According to an exemplary embodiment, the subcooler valve 226 is configured to facilitate selectively restricting the flow of the second portion of the liquid refrigerant exiting the CPR 136 from entering the subcooler 202. By way of example, the subcooler 202 may not receive the second portion of the liquid refrigerant when the subcooler valve 226 is configured in a closed orientation (i.e., all of the liquid refrigerant flows through the refrigerant circuit 210). By way of another example, the subcooler 202 may receive the second portion of the liquid refrigerant when the subcooler valve 226 is configured in an open orientation. According to an exemplary embodiment, the subcooler valve 226 is configured to be arranged in the open orientation while the first evaporator system 160 and/or the second evaporator system 180 are operating in the cooling mode and the closed orientation while the first evaporator system 160 and the second evaporator system 180 are not operating in the cooling mode.

As shown in FIGS. 18 and 19, the subcooler expansion valve 228 is positioned along the working fluid inlet conduit 222 downstream of the subcooler valve 226 and upstream of the subcooler 202 (i.e., the second inlet, the working fluid inlet). According to an exemplary embodiment, the subcooler expansion valve 228 is configured to lower the pressure and the temperature of the second portion of the liquid refrigerant such that the second portion of the liquid refrigerant evaporates into a second evaporated gaseous refrigerant. The second evaporated gaseous refrigerant may thereby flow through the subcooler 202 via the cooling circuit 220 to sub-cool the first portion of the liquid refrigerant flowing through the subcooler 202 via the refrigerant circuit 210 such that sub-cooled liquid refrigerant exits the subcooler 202 within the refrigerant outlet conduit 214 (e.g., the first portion of the liquid refrigerant transfers heat thereof to the lower temperature second evaporated gaseous refrigerant, etc.). The sub-cooled liquid refrigerant may thereafter be provided to the first evaporator system 160 and/or the second evaporator system 180. The second evaporated gaseous refrigerant may be provided by the working fluid outlet conduit 224 to the LSS conduit 32 such that the second evaporated gaseous refrigerant is returned to the compressor system 20 for recompression.

In some embodiments, the subcooler system 200 includes a plurality of subcoolers 202 arranged in parallel with one another. Each of the subcoolers 202 may be associated with a respective evaporator system (e.g., a first subcooler associated with the first evaporator system 160, a second subcooler associated with the second evaporator system 180, etc.) or the plurality of subcoolers 202 may be collectively associated with all of the evaporator systems of a respective CES module 102. In an alternative embodiment, the cooling circuit 220 is coupled to a different fluid source (e.g., the fluid cooler 40, a decentralized fluid cooler, etc.) that provides a working fluid that is not from the CPR 136 (e.g., a working fluid that is not the same as the refrigerant in the system, a working fluid that is not the liquid refrigerant exiting the CPR 136, etc.).

According to an exemplary embodiment, the subcooler system 200 is located after the CPR 136 within the CES module 102 which may minimize the mass flow of the working fluid (e.g., the second portion of the liquid refrigerant, etc.) used to sub-cool the liquid refrigerant (e.g., the first portion of the liquid refrigerant, etc.) being supplied to the first evaporator expansion valve 166 and the second evaporator expansion valve 186, and minimizes the compressor capacity penalty. A subcooler used in a traditional centralized condensing refrigeration system sub-cools the liquid refrigerant after the condenser where the system pressure is the highest. A larger pressure drop increases the vaporized liquid and increases the compressor capacity penalty.

According to an exemplary embodiment, the subcooler system 200 is positioned within the CES module 102 at or above a relative height of the first evaporator system 160 and/or the second evaporator system 180. Such relative elevation and close proximity to the first evaporator system 160 and/or the second evaporator system 180 may minimize the required sub-cooling needed to ensure the refrigerant (e.g., the first portion of the liquid refrigerant, etc.) is provided to the first evaporator expansion valve 166 and/or the second evaporator expansion valve 186 in a liquid state. Conversely, a subcooler used in a traditional centralized condensing refrigeration system may typically be located in the engine room which may be fifteen feet or more below the elevation of the evaporators and at significantly greater horizontal distances therefrom.

According to an exemplary embodiment, the subcooler system 200 is configured to provide sufficient liquid refrigerant sub-cooling (e.g., to the first portion of the liquid refrigerant, etc.) to overcome any pressure losses in the piping, valves, and/or strainers within the CES module 102. Such localized sub-cooling may optimize the operation of the first evaporator expansion valve 166 and/or the second evaporator expansion valve 186 by controlling the liquid refrigerant temperature at the entrance of each expansion valve. Conversely, a subcooler used in traditional centralized condensing refrigeration system may provide varying liquid refrigerant temperatures at the entrance of each expansion valve based on pressure losses and distances between the subcooler and each expansion valve. Additionally, since the subcooler system 200 may optimize the operation of the first evaporator expansion valve 166 and/or the second evaporator expansion valve 186, the refrigerant flow after the first evaporator expansion valve 166 and/or the second evaporator expansion valve 186 and distribution within the first evaporator conduit 162 and/or the second evaporator conduit 182, respectively, is optimized. The quality of the liquid refrigerant entering each of the first evaporator conduit 162 and/or the second evaporator conduit 182 may thereby be more consistent than a traditional centralized condensing refrigeration system having a subcooler.

As shown in FIG. 19, the CES module 102 has a different defrost setup to facilitate the defrost mode compared to the CES module 102 of FIG. 2 and FIG. 6. It should be noted that the below description of the defrost setup of the CES module 102 of FIG. 19 is described in relation to a single evaporator system (e.g., the first evaporator system 160, etc.), but may be similar for two or more evaporator systems (e.g., the first evaporator system 160 and the second evaporator system 180, etc.). As shown in FIG. 19, the CES module 102 includes a feed valve, shown as subcooled liquid feed valve 230, positioned between the refrigerant outlet conduit 214 of the subcooler 202 and a liquid supply line, shown as evaporator supply line 242, that feeds into the first evaporator system 160 to facilitate selectively isolating the first evaporator system 160 from the subcooler 202; an expansion valve, shown as electronic expansion valve 232, positioned along the evaporator supply line 242 upstream of the first evaporator system 160; a suction valve, shown as evaporator suction valve 234, positioned downstream of the first evaporator system 160 to facilitate selectively isolating the first evaporator system 160 from the compressor suction of the compressor system 20; a hot gas valve, shown as hot gas solenoid valve 236, positioned to facilitate selectively isolating the first evaporator system 160 from the compressor discharge of the compressor system 20; a regulator, shown as hot gas pressure regulator 238, positioned to selectively control the pressure of the hot gas received by the first evaporator system 160 from the compressor system 20; a bypass, shown as bypass line 240, extending from an outlet of the first evaporator system 160 and positioned to connect the outlet of the first evaporator system 160 to the evaporator supply line 242 to facilitate bypassing the electronic expansion valve 232; a return line, shown as condensate return line 244, extending between the evaporator supply line 242 and an inlet of the CPR 136; and a regulator, shown as condensate pressure regulator 246, positioned along the condensate return line 244 to facilitate selectively isolating the CPR 136 from the first evaporator system 160.

According to an exemplary embodiment, activating the defrost mode of the CES module 102 of FIG. 19 includes: (i) closing the subcooled liquid feed valve 230 to prevent subcooled liquid refrigerant from the subcooler 202 from entering the first evaporator system 160; (ii) closing the electronic expansion valve 232; (iii) closing the evaporator suction valve 234 after a time delay to allow the liquid refrigerant in the first evaporator system 160 to completely evaporate and to isolate the first evaporator system 160 from the compressor suction of the compressor system 20; (iv) opening the hot gas solenoid valve 236 to supply hot gas from the compressor system 20 to the first evaporator system 160 with the pressure thereof controlled by the hot gas pressure regulator 238 such that hot gas condensate exits the first evaporator system 160 along the bypass line 240 and flows around the electronic expansion valve 232, into the evaporator supply line 242, and then to the condensate return line 244; (v) and then as the pressure of the hot gas condensate rises within the condensate return line 244, the condensate pressure regulator 246 is configured to open and allow the hot gas condensate to flow into the CPR 136 for storage.

According to an exemplary embodiment, the mechanical arrangement and structure of the CES modules 102 provide a simplified, more economical, and a more reliable low charge refrigeration system relative to traditional refrigeration systems having a decentralized CES. By way of example, the CES modules 102 facilitate providing a refrigeration system with a more economical design based on a reduction of components relative to traditional refrigeration systems having a decentralized CES (e.g., from over ninety components to less than forty components, etc.). Such a reduction in components not only reduces the material costs to construct the refrigeration system 10, but labor costs associated with installing the refrigeration system 10. Further, fewer components may additionally reduce ongoing maintenance requirements and costs for the refrigeration system 10 relative to traditional refrigeration systems having a decentralized CES. By way of another example, the CES modules 102 facilitate providing a refrigeration system with increased reliability based on the reduction of components relative to traditional refrigeration systems having a decentralized CES. The refrigeration system 10 is a sealed system and any type of leak either into or out of the refrigeration system 10 may cause efficiency, environmental, and safety issues. Therefore, reducing the number of components (e.g., each which may be separately welded into the refrigeration system 10, etc.) may reduce the possibilities for leaks to occur.

The controller 60 may be configured to selectively engage, selectively disengage, control, and/or otherwise communicate with components of the refrigeration system 10. As shown in FIG. 1, the controller 60 is coupled to the compressor system 20, the fluid cooler 40, and the CES modules 102. In other embodiments, the controller 60 is coupled to more or fewer components. The controller 60 may be configured to control the operation of at least one of the compressor system 20, the fluid cooler 40, and the CES modules 102. By way of example, the controller 60 may send and receive signals with the compressor system 20 (e.g., the compressor 22, the compressor accumulator 24, etc.), the fluid cooler 40 (e.g., the cooler pump 42, the cooling element, etc.), the CPR 136 (e.g., a liquid level sensor thereof, etc.), the condenser system 140 (e.g., the condenser fan 144, etc.), the HG condensing valve 146, the HSS valve 148, the first evaporator inlet valve 150, the first evaporator outlet valve 152, the first evaporator inlet defrost valve 154, the first evaporator outlet defrost valve 156, the first evaporator system 160 (e.g., the first evaporator fan 164, the first evaporator expansion valve 166, pressure and/or temperature sensors positioned along the first evaporator outlet conduit 120, etc.), the second evaporator inlet valve 170, the second evaporator outlet valve 172, the second evaporator inlet defrost valve 174, the second evaporator outlet defrost valve 176, the second evaporator system 180 (e.g., the second evaporator fan 184, the second evaporator expansion valve 186, pressure and/or temperature sensors positioned along the second evaporator outlet conduit 126, etc.), the HG defrost pressure regulator 190, and/or the subcooler system 200 (e.g., the subcooler valve 226, etc.).

The controller 60 may be implemented as a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. According to the exemplary embodiment shown in FIG. 1, the controller 60 includes a processing circuit 62 and a memory 64. The processing circuit 62 may include an ASIC, one or more FPGAs, a DSP, circuits containing one or more processing components, circuitry for supporting a microprocessor, a group of processing components, or other suitable electronic processing components. In some embodiments, the processing circuit 62 is configured to execute computer code stored in the memory 64 to facilitate the activities described herein. The memory 64 may be any volatile or non-volatile computer-readable storage medium capable of storing data or computer code relating to the activities described herein. According to an exemplary embodiment, the memory 64 includes computer code modules (e.g., executable code, object code, source code, script code, machine code, etc.) configured for execution by the processing circuit 62. The memory 64 includes various actuation profiles corresponding to loading conditions experienced by the refrigeration system 10 and/or corresponding to modes of operation of components of the refrigeration system 10 (e.g., a cooling mode, a defrost mode, a standby mode, etc.), according to an exemplary embodiment. In some embodiments, controller 60 represents a collection of processing devices (e.g., servers, data centers, etc.). In such cases, the processing circuit 62 represents the collective processors of the devices, and the memory 64 represents the collective storage devices of the devices.

Figure 3:
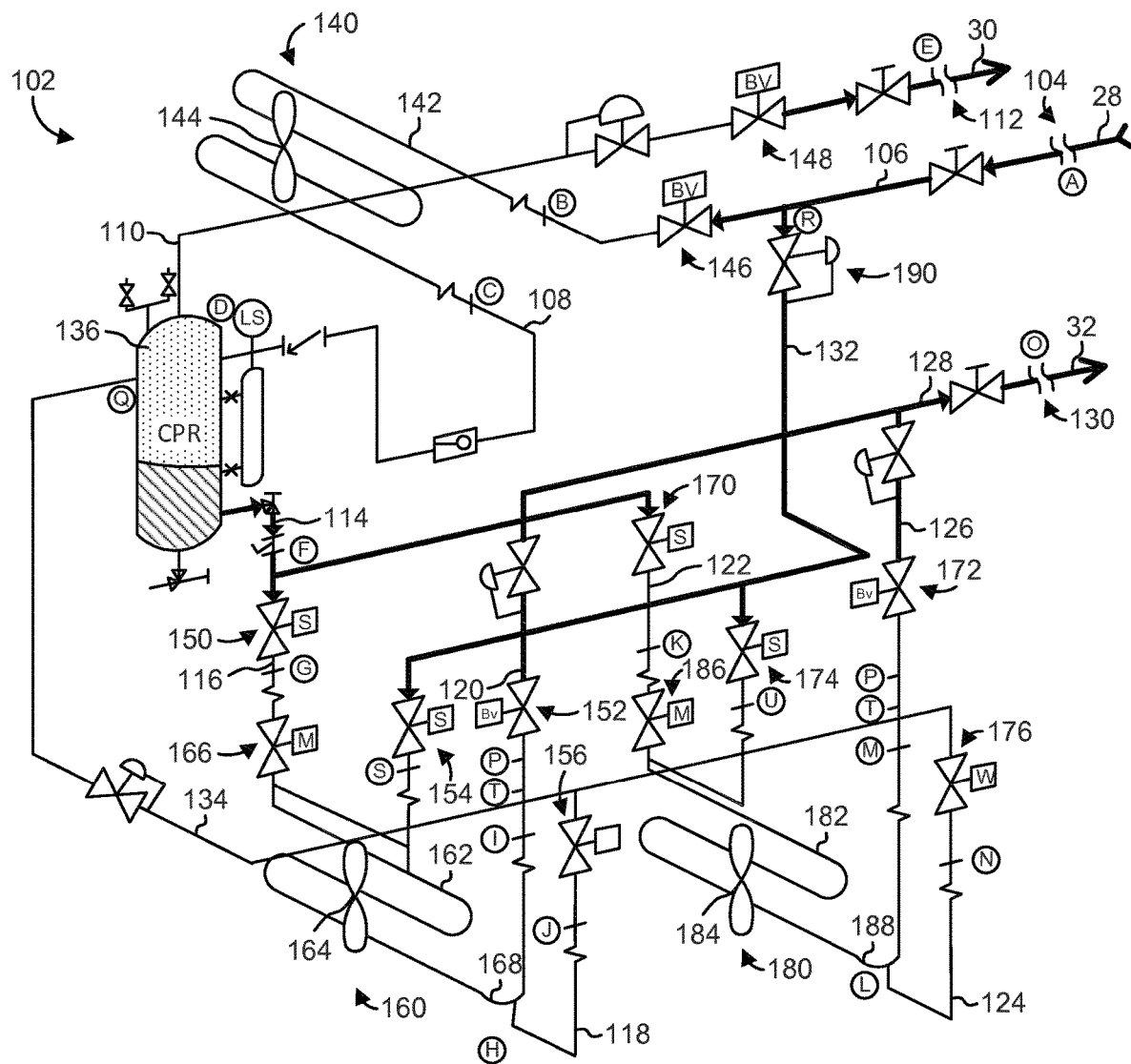
FIG. 3 is a schematic diagram of the module of FIG. 2 configured in a standby mode, according to an exemplary embodiment.

According to the exemplary embodiment shown in FIG. 3, the CES module 102 in configured in a standby mode. The controller 60 may be configured to operate the CES module 102 in the standby mode in response to a temperature of the zones (e.g., a refrigerated area, a first zone, a second zone, etc.) associated with the first evaporator system 160 and the second evaporator system 180 being less than a temperature setpoint (e.g., the zone in currently below a desired temperature and therefore does not require cooling, etc.). To initiate the standby mode of the CES module 102, the controller 60 may be configured to close the HG condensing valve 146, the HSS valve 148, the first evaporator inlet valve 150, the second evaporator inlet valve 170, the first evaporator outlet valve 152, the second evaporator outlet valve 172, the first evaporator inlet defrost valve 154, the second evaporator inlet defrost valve 174, the first evaporator outlet defrost valve 156, and/or the second evaporator outlet defrost valve 176 to prevent refrigerant from flowing into and out of the CES module 102. The controller 60 may additionally be configured to set the first evaporator system 160 and/or the second evaporator system 180 to a ready mode while the CES module 102 is in the standby mode (e.g., in preparation for a future cooling operation, etc.).

Figure 4:
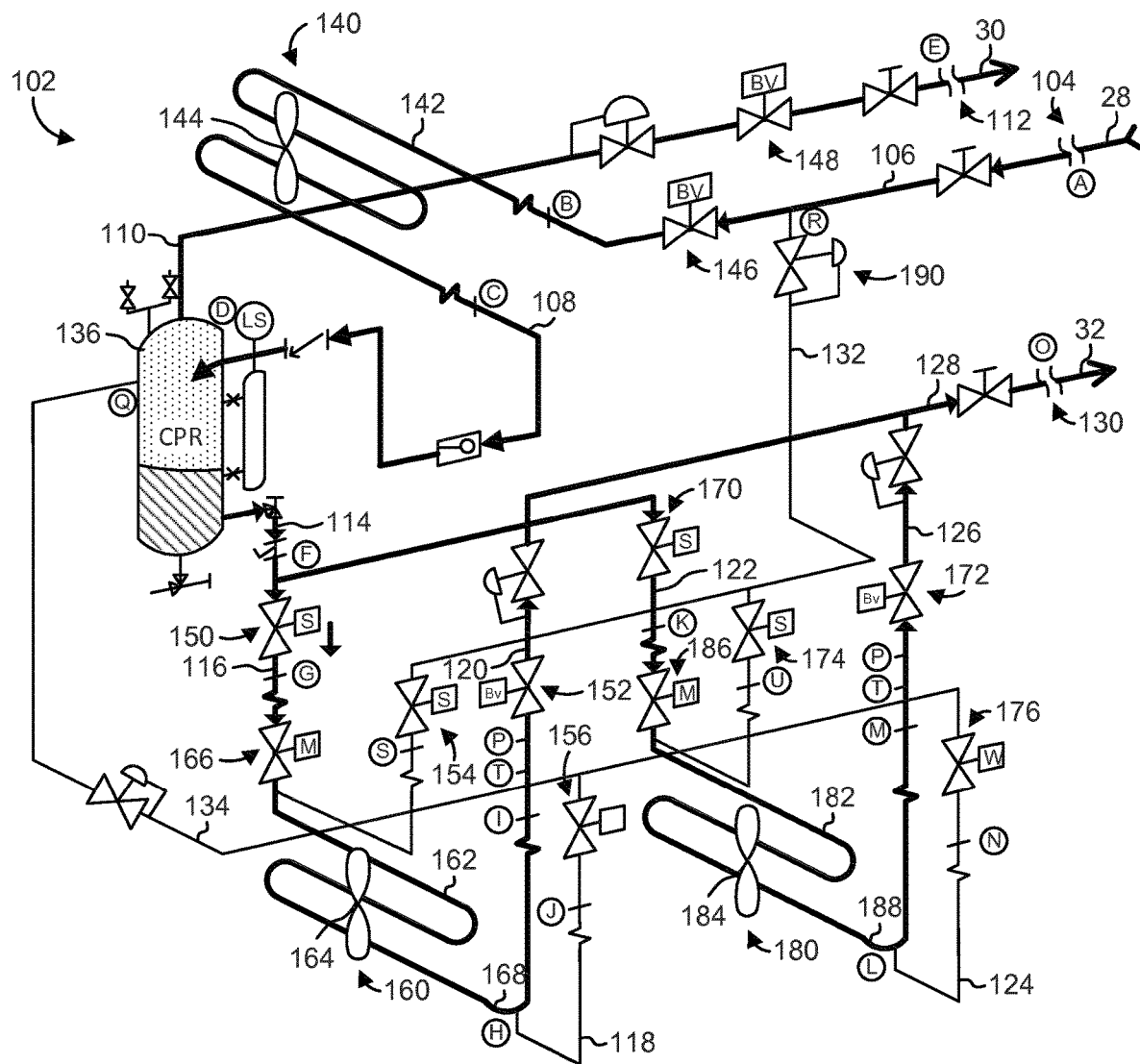
FIG. 4 is a schematic diagram of the module of FIG. 2 configured in a cooling mode, according to an exemplary embodiment.

According to the exemplary embodiment shown in FIG. 4, the CES module 102 is configured in an active mode with the first evaporator system 160 and the second evaporator system 180 in a cooling mode. The controller 60 may be configured to operate the CES module 102 in the active mode with the first evaporator system 160 and/or the second evaporator system 180 in the cooling mode in response to a temperature of a zone (e.g., a refrigerated area, a first zone, a second zone, etc.) associated with the first evaporator system 160 and/or the second evaporator system 180 being greater that a temperature setpoint (e.g., the respective zone is currently above a desired temperature and therefore requires cooling, etc.). To initiate the cooling mode of the first evaporator system 160 and/or the second evaporator system 180, the controller 60 may be configured to open the HG condensing valve 146 to allow a gaseous refrigerant (e.g., a high pressure and temperature gaseous refrigerant, etc.) from the compressor 22 to flow into the condenser system 140 (e.g., if the liquid refrigerant level within the CPR 136 is not above a desired liquid refrigerant level, etc.). The controller 60 may further control a stage of the condenser system 140 (e.g., a condenser fan speed setpoint of the condenser fan 144, a flow rate of the working fluid provided by the fluid cooler 40, etc.) to provide a suitable condenser capacity to assist in maintaining a level of the liquid refrigerant within the CPR 136. For example, increasing the speed of the condenser fan 144 and/or increasing the flow rate of the working fluid provided by the fluid cooler 40 may thereby increase the capacity of the condenser system 140 to perform the condensing operation (e.g., condense a greater quantity of the gaseous refrigerant to liquid refrigerant, etc.). Such control of the stage of the condenser system 140 may allow for increased efficiency of the CES module 102 relative to traditional CES systems.

During the cooling mode, the controller 60 may be further configured to open the first evaporator inlet valve 150 to allow liquid refrigerant from the CPR 136 to enter the first evaporator system 160 for evaporation and open the first evaporator outlet valve 152 to allow the evaporated gaseous refrigerant to exit the first evaporator system 160 to return to the compressor system 20 for recompression. The controller 60 may be configured to additionally or alternatively open the second evaporator inlet valve 170 to allow liquid refrigerant from the CPR 136 to enter the second evaporator system 180 for evaporation and open the second evaporator outlet valve 172 to allow the evaporated gaseous refrigerant to exit the second evaporator system 180 to return to the compressor system 20 for recompression.

The controller 60 may further control a stage of the first evaporator system 160 and/or the second evaporator system 180 to provide a suitable evaporator capacity to assist in maintaining the level of the liquid refrigerant within the CPR 136, as well as providing the desired cooling to the respective cooling zone. Controlling the stage of the first evaporator system 160 and/or the second evaporator system 180 may include controlling at least one of (i) a first evaporator fan speed setpoint of the first evaporator fan 164 and (ii) a first superheat setpoint of the first evaporator expansion valve 166 and/or at least one of (i) a second evaporator fan speed setpoint of the second evaporator fan 184 and (ii) a second superheat setpoint of the second evaporator expansion valve 186, respectively. For example, increasing the first evaporator fan speed setpoint of the first evaporator fan 164 may increase the capacity of the first evaporator system 160 to perform the evaporation operation (e.g., evaporate a greater quantity of the liquid refrigerant to gaseous refrigerant, etc.) to provide cooling to the surrounding area. In another example, decreasing the first superheat setpoint of the first evaporator expansion valve 166 may allow a greater amount of liquid refrigerant to enter the first evaporator system 160, thereby increasing the capacity of the first evaporator system 160 to perform the evaporation operation to provide cooling to the surrounding area. Such control of the stage of the first evaporator system 160 and/or the second evaporator system 180 may allow for increased efficiency of the CES module 102 relative to traditional CES systems.

Figure 5:
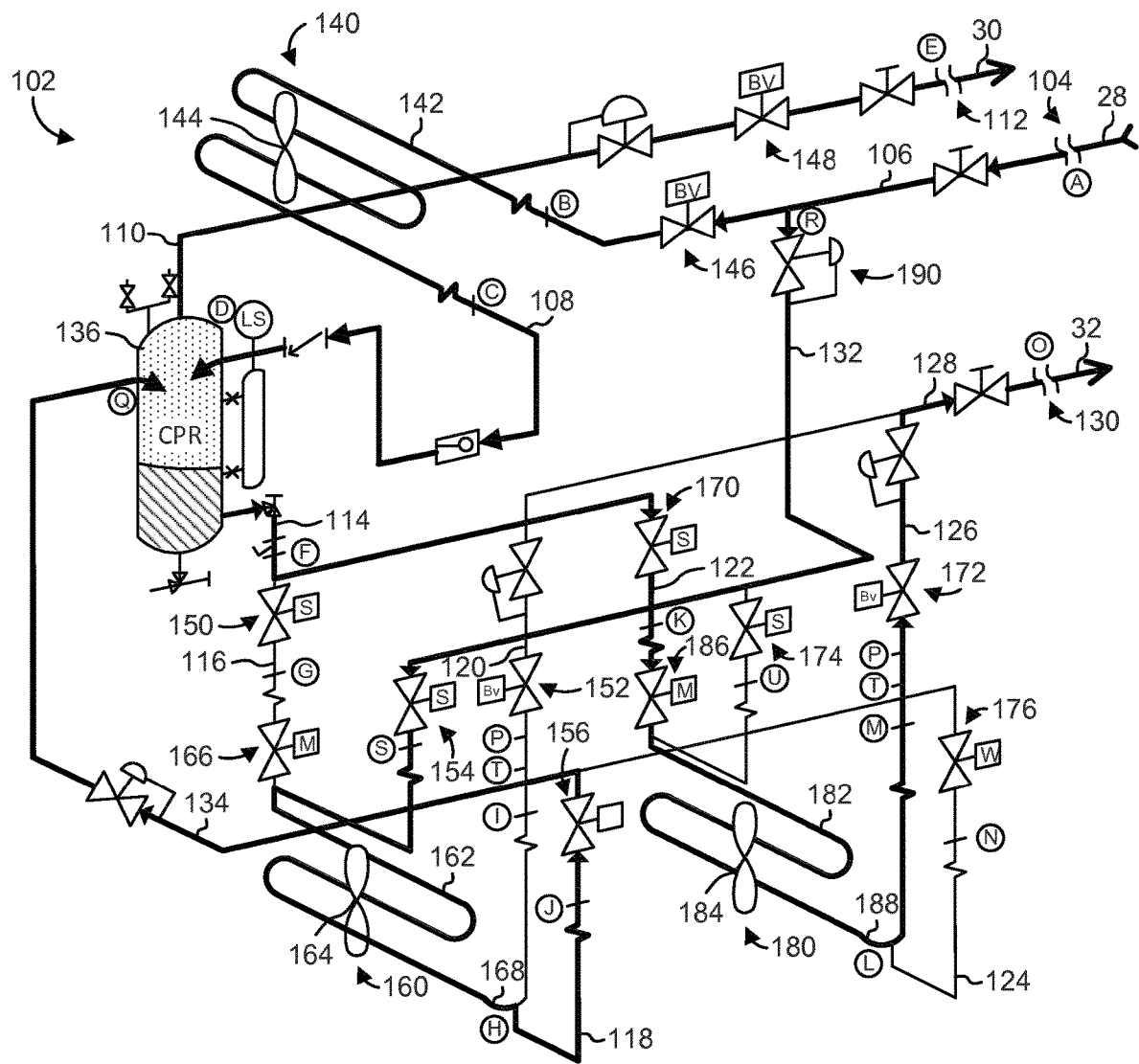
FIG. 5 is a schematic diagram of the module of FIG. 2 configured in a defrost mode and a cooling mode, according to an exemplary embodiment.

According to the exemplary embodiment shown in FIG. 5, the CES module 102 is configured in an active mode with the first evaporator system 160 in a defrost mode and the second evaporator system 180 in a cooling mode. The cooling mode of the second evaporator system 180 may operate similar to that described in relation to FIG. 4. The controller 60 may be configured to operate the first evaporator system 160 (or the second evaporator system 180) in the defrost mode in response to a defrost timer thereof expiring. The defrost timer may be preset within the controller 60, selected by an operator of the refrigeration system 10, and/or still otherwise set. According to an exemplary embodiment, the defrost timer sets a time (e.g., six hours, four hours, twelve hours, etc.) between defrost operations of the first evaporator system 160 (and/or the second evaporator system 180). In one embodiment, the time is determined based on an operating time of the first evaporator system 160 (and/or the second evaporator system 180) between defrost operations. In other embodiments, the time is determined based on elapsed time between defrost operations of the first evaporator system 160 (and/or the second evaporator system 180) or some other mechanism to signal the start of a defrost cycle.

The controller 60 may be configured to initiate the defrost mode of the first evaporator system 160 (and/or the second evaporator system 180) to melt frost that may have accumulated on the evaporator systems during the cooling mode. To initiate the defrost mode, the controller 60 may be configured to stop the cooling mode and evaporate (e.g., boil out, etc.) any remaining liquid refrigerant within the first evaporator system 160 (and/or the second evaporator system 180). The controller 60 may be further configured to close the first evaporator inlet valve 150 (and/or the second evaporator inlet valve 170) to prevent a liquid refrigerant from entering the first evaporator system 160 (and/or the second evaporator system 180) from the CPR 136. The controller 60 may be further configured to close the first evaporator outlet valve 152 (and/or the second evaporator outlet valve 172) to prevent the gaseous refrigerant from exiting the first evaporator system 160 (and/or the second evaporator system 180) to the compressor system 20 (e.g., the compressor accumulator 24, etc.). The controller 60 may then be configured to open the first evaporator inlet defrost valve 154 (and/or the second evaporator inlet defrost valve 174) to allow a gaseous refrigerant to flow into the first evaporator system 160 (and/or the second evaporator system 180) from the compressor system 20. The controller 60 may be further configured to open the first evaporator outlet defrost valve 156 (and/or the second evaporator outlet defrost valve 176) to allow liquid refrigerant condensate (e.g., condensed from the gaseous refrigerant, etc.) to flow into the CPR 136. According to an exemplary embodiment, the first evaporator fan 164 (and/or the second evaporator fan 184) is shut off by the controller 60 during the defrost mode of operation. The first evaporator system 160 (and/or the second evaporator system 180) may function as a condenser during the defrost mode of operation.

According to an exemplary embodiment, the controller 60 is configured to facilitate providing consistent and stable coordinated balancing of the level of liquid refrigerant in all of the CPR 136 of the CES 100 using the modulating capacities inherent in the local condenser systems and evaporator systems of each CES module 102. By way of example, each CES module 102 may require a minimum amount liquid refrigerant to satisfy its respective evaporator systems at all times, yet not more than a maximum amount such that it may be possible to pull liquid refrigerant from the CPR 136 and send it back to the compressor system 20 (e.g., liquid refrigerant in the suction line of compressor system 20 can potentially damage the compressor 22).

Since all the CES modules 102 are connected to the HG refrigerant conduit 28, the HSS conduit 30, and the LSS conduit 32, and the refrigerant mass in main headers of the compressor system 20 and the individual CES modules 102 may vary with changing conditions of the refrigeration system 10, the liquid refrigerant levels in each CES module 102 may vary over time. The controller 60 may be configured to continually manage the refrigerant charge between the various CES modules 102 to ensure each CES module 102 has a sufficient liquid refrigerant level in the respective CPRs 136, while simultaneously allowing the refrigeration system 10 to operate with the lowest possible total refrigerant charge.

Traditionally such control is performed by monitoring the liquid levels in each CES module 102 and then controlling the HG condensing valve 146 on the inlet of the condenser system 140 to control the amount and flow rate of compressed gaseous refrigerant that flows into the condenser system 140 to regulate the amount of gaseous refrigerant that is condensed and stored in the CPR 136 in an effort to control the liquid level in the CPR 136. However, such control may be inefficient in that it reduces the capacity of the condenser system 140 by lowering the local condensing pressure seen by the condenser system 140. There is no energy benefit to this type of control as it neither (i) reduces the discharge pressure in HG refrigerant conduit 28 (e.g., the discharge pressure impacts the compressor energy, the lower the discharge pressure the more efficient the compressor system 20 may operate, etc.) nor (ii) reduces the condenser system energy. If the liquid refrigerant level within the CPR 136 falls too far (e.g., below a minimum threshold, etc.), refrigerant flow to the evaporator systems may be shut off until the liquid refrigerant level in the CPR 136 returns to a desired level. Shutting the evaporators off may cause large and inefficient swings in compressor loading and consequential swings in condensing pressure.

According to an exemplary embodiment, the refrigeration system 10 of the present disclosure is controlled by the controller 60 according to a more consistent approach of modulating both the refrigerant flow into the CPR 136 from the condenser system 140 and modulating the refrigerant flow out of the CPR 136 to the first evaporator system 160 and/or the second evaporator system 180. Modulating both of the inlet and outlet flows of the CPR 136 allows for precise and stable control of the refrigerant level in each CPR 136.

As a first step, the liquid refrigeration level within the CPR 136 is controlled by the controller 60 by modulating the local condenser capacity of the condenser system 140 to provide a desired mass flow of liquid refrigerant into the CPR 136. As described above, the capacity control of the condenser system 140 may depend on the type of local condenser of the respective CES module 102.

By way of example, the capacity (and therefore the condensed refrigerant liquid flow out of the condenser system 140) for adiabatic condensers, dry/air-cooled condensers, or evaporative condensers is controlled by the controller 60 by modulating the condenser fan speed setpoint of the condenser fan 144. The capacity of the condenser system 140 may be approximately proportional to the condenser airflow provided across to the condenser conduit 142 by the condenser fan 144. The condenser airflow is directly proportional to the condenser fan speed setpoint of the condenser fan 144. Due to the fan affinity laws, the energy of the condenser fan 144 is proportional to the cube of the condenser fan speed setpoint of the condenser fan 144. Therefore, if only half the capacity of the condenser system 140 is required, only about half the airflow and consequently only about one eighth of the energy to operate the condenser fan 144 may be required. Relative to traditional systems, where if only half the capacity of the condenser system 140 is required, the HG condensing valve 146 is modulated partially shut, reducing the condensing pressure and capacity of the condenser system 140 by making the local condensing conditions more difficult. However, to produce the reduced capacity at these more difficult conditions requires the same original full condenser fan speed, leading to inefficient operation of the condenser system 140 (e.g., since there is no reduction in condenser fan energy, etc.). Thus, the condenser system 140 of the present disclosure provides energy savings relative to traditional systems.

By way of another example, the capacity for plate-frame condensers, shell and tube condensers, and/or shell and plate condensers may be controlled by the controller 60 by modulating the working fluid flow provided to the plate-frame condenser, the shell and tube condenser, and/or the shell and plate condenser from the fluid cooler 40. Modulating the working cooling fluid flow instead of modulating the gaseous refrigerant flow into the condenser system 140 with the HG condensing valve 146 has at least two system energy benefits. First, the energy of the cooler pump 42 is reduced as the working cooling fluid flow is reduced as the required capacity of the condenser system 140 reduces. Second, reducing the working fluid flow maintains the temperature range on the fluid cooler 40 used to reject the heat to the atmosphere. Maintaining the temperature range of the fluid cooler 40 facilitates rejecting heat to the atmosphere more efficiently (e.g., requires less fluid cooler fan energy, etc.).

As a second step, the liquid refrigeration level within the CPR 136 is controlled by the controller 60 by modulating the flow of the liquid refrigerant out of the CPR 136 (e.g., when condenser control may not maintain a desired liquid level in the CPR 136, etc.). The control of the flow of the liquid refrigerant may be controlled in two ways. In a first example, the controller 60 may control the capacity of the first evaporator system 160 and/or the second evaporator system 180 by modulating the first evaporator fan speed setpoint of the first evaporator fan 164 and the second evaporator fan speed setpoint of the second evaporator fan 184, respectively. Again, similar to airflow on a condenser, modulating the capacity of the first evaporator system 160 and/or the second evaporator system 180 by controlling the first evaporator fan speed setpoint of the first evaporator fan 164 and the second evaporator fan speed setpoint of the second evaporator fan 184, respectively, may be highly energy efficient due to the fan affinity laws. Not only may this reduce the fan energy associated with the first evaporator fan 164 and/or the second evaporator fan 184, but it may also reduce the heat energy produced by the respective fans. Reducing the heat produced by the fans may reduce the total amount of heat that the refrigeration system 10 has to remove from the conditioned space. In a second example, the controller 60 may additionally or alternatively control the capacity of the first evaporator system 160 and/or the second evaporator system 180 by adjusting the first superheat setpoint of the first evaporator expansion valve 166 and the second superheat setpoint of the second evaporator expansion valve 186, respectively. For example, with a fixed room temperature and low side suction pressure, increasing the superheat setting for the expansion valves may reduce the flow of liquid refrigerant into the evaporator systems from the CPR 136 as the expansion valves throttle back liquid refrigerant flow to increase the refrigerant superheat at the outlet of the evaporators.

According to an exemplary embodiment, the controller 60 is further configured to control all of the active CES modules 102 to provide coordinated head pressure control (e.g., for the compressor system 20, etc.). Such coordinated head pressure may provide efficient and stable operation of the refrigeration system 10 as a whole, consistent with meeting each evaporator's refrigerant requirements. For example, reducing head pressure of the compressor 22 may be an effective way to reduce compressor energy. The energy required to operate the compressor system 20 is typically the largest contributor to the overall energy of the refrigeration system 10. Therefore, as ambient temperature and load conditions change, the capacity of the condenser systems 140 of each active CES module 102 may be controlled to produce a compressor head pressure that results in the lowest overall energy use to operate the refrigeration system 10 while still maintaining adequate head pressure to meet the refrigerant needs of each evaporator system.

Thus, the controller 60 may be configured to operate the refrigeration system 10 and each of the active CES modules 102 to minimize the head pressure of the compressor system 20. Such operation may include the controller 60 first determining which CES module 102 of the refrigeration system 10 is operating at the highest condenser capacity stage (e.g., based on the condenser fan setpoint of the condenser fan 144, based on the flow rate of the working fluid from the fluid cooler 40, to take into account the condensing head pressure requirement of all the CES modules 102, etc.). The controller 60 may then designate the CES module 102 operating at the highest condenser capacity stage as the lead CES module. The lead CES module is not fixed however, but may shift as load conditions change on each individual CES module 102. Changing system head pressure impacts the capacity of the condenser systems 140, which in turn impacts the ability of the condenser systems 140 to generate liquid refrigerant flow into the respective CPRs 136. The controller 60 may be further configured to set the minimum head pressure requirement for all the CES modules 102 of the refrigeration system 10 to the head pressure requirement of the lead CES module 102 (e.g., independently controlling the head pressure on any of the other condenser systems 140 to drive the system head pressure lower may lead to a lack of condenser capacity and therefore the lack of liquid refrigerant to meet the required evaporator load on the lead CES module 102, etc.). Thus, the controller 60, by taking the aforementioned factors into account, may continuously evaluate the condenser capacity stages of all active CES modules 102 in the refrigeration system 10 and control the minimum system head pressure leading to the most efficient operation of the compressor system 20, while assuring that the lead CES module (e.g., when operating at its maximum condenser stage, etc.) has sufficient liquid refrigerant to meet the cooling demand.

According to an exemplary embodiment, the controller 60 is configured to operate the subcooler system 200 while at least one of the first evaporator system 160 and the second evaporator system 180 are operating in the cooling mode (e.g., during the cooling mode only, etc.). The controller 60 may thereby operate the subcooler system 200 (e.g., the subcooler valve 226, etc.) in an active mode when a cooling operation is desired and an inactive mode when a cooling operation is not desired. According to an exemplary embodiment, operating the subcooler system 200 only during the cooling mode minimizes the mass flow of working fluid required to sub-cool the liquid refrigerant flowing from the CPR 136 to the first evaporator system 160 and/or the second evaporator system 180, as well as minimizes the energy required to operate the refrigeration system 10. By way of example, only the subcooler systems 200 that are needed at a given moment may be operating which may reduce energy consumption, as well as any capacity penalty on the compressor system 20. Conversely, a subcooler used in a traditional centralized condensing refrigeration system sub-cools all the liquid refrigerant from the condenser regardless of the number of evaporators in operation which may have a greater impact on the capacity penalty at the compressor. In one embodiment, the controller 60 implements the control scheme represented in FIGS. 7-17 when the CES modules 102 include the subcooler systems 200. In other embodiments, the controller 60 implements any suitable control scheme.

Accordingly, the refrigeration system 10 having CES modules 102 with decentralized subcooler systems 200 provides various advantages relative to traditional centralized condensing refrigeration systems that may include a subcooler. First, a decentralized subcooler may provide optimized distributed liquid refrigerant sub-cooling. By way of example, the subcooler system 200 may only operate when at least one of the evaporators from a respective CES module 102 is in operation. This may minimize the mass flow of the second evaporated gaseous refrigerant used to sub-cool the first portion of the liquid refrigerant at the entrance of the expansion valves. The second evaporated gaseous refrigerant may be returned to the compressor system 20. Therefore, the capacity penalty at the compressor system 20 may be minimized. A subcooler used in a traditional centralized condensing refrigeration system sub-cools all the liquid refrigerant from the condenser regardless of the number of evaporators in operation which has a greater impact on the capacity penalty at the compressor. Second, a decentralized subcooler may provide reduced pressure sub-cooling. By way of example, the subcooler system 200 may be located after the CPR 136 within the CES module 102. Such positioning may minimize the mass flow of the second evaporated gaseous refrigerant used to sub-cool the first portion of the liquid refrigerant provided to the expansion valves and minimizes the compressor capacity penalty. A subcooler used in a traditional centralized condensing refrigeration system sub-cools the liquid after the condenser where the system pressure is the highest. A larger pressure drop increases the vaporized liquid and increases the compressor capacity penalty. Third, a decentralized subcooler may provide localized sub-cooling. By way of example, the subcooler system 200 may be located within the CES module 102 at or above the height of the evaporator(s). Such elevation and close proximity to the evaporator(s) may minimize the required sub-cooling needed to ensure liquid at the entrance to the expansion valves. A subcooler used in a traditional centralized condensing refrigeration system is typically located in the engine room which may be fifteen feet or more below the elevation of the evaporators and at significantly greater horizontal distances. Fourth, a decentralized subcooler may provide optimized operation of the expansion valves (e.g., the first evaporator expansion valve 166, the second evaporator expansion valve 186, etc.). By way of example, the subcooler system 200 may provide sufficient liquid refrigerant sub-cooling to overcome the pressure losses in the piping, valves, and/or strainers within the CES module 102. Such localized sub-cooling may optimize the operation of the expansion valves by controlling the liquid refrigerant temperature at the entrance of each expansion valve. A subcooler used in traditional centralized condensing refrigeration system will provide varying liquid refrigerant temperatures at the entrance of each expansion valve based on the relative pressure losses and distances between the subcooler and each expansion valve. Fifth, a decentralized subcooler may provide optimized performance of the evaporators (e.g., the first evaporator system 160, the second evaporator system 180, etc.). By way of example, since the localized sub-cooling may optimize the operation of the expansion valves, the refrigerant flow after the expansion valves and distribution within the evaporators may also be optimized. The quality of the refrigerant entering each evaporator may thereby be more consistent than a traditional centralized condensing refrigeration system with a subcooler.

Referring now to FIGS. 7-10, methods 700, 800, 900, and 1000 for controlling a module of a decentralized condenser evaporator system to perform a cooling operation are shown according to an example embodiment. In one example embodiment, methods 700, 800, 900, and 1000 may be implemented with the CES 100 and the controller 60 of FIGS. 1-6, 18, and 19. As such, methods 700, 800, 900, and 1000 may be described with regard to FIGS. 1-6, 18, and 19.

Figure 7:
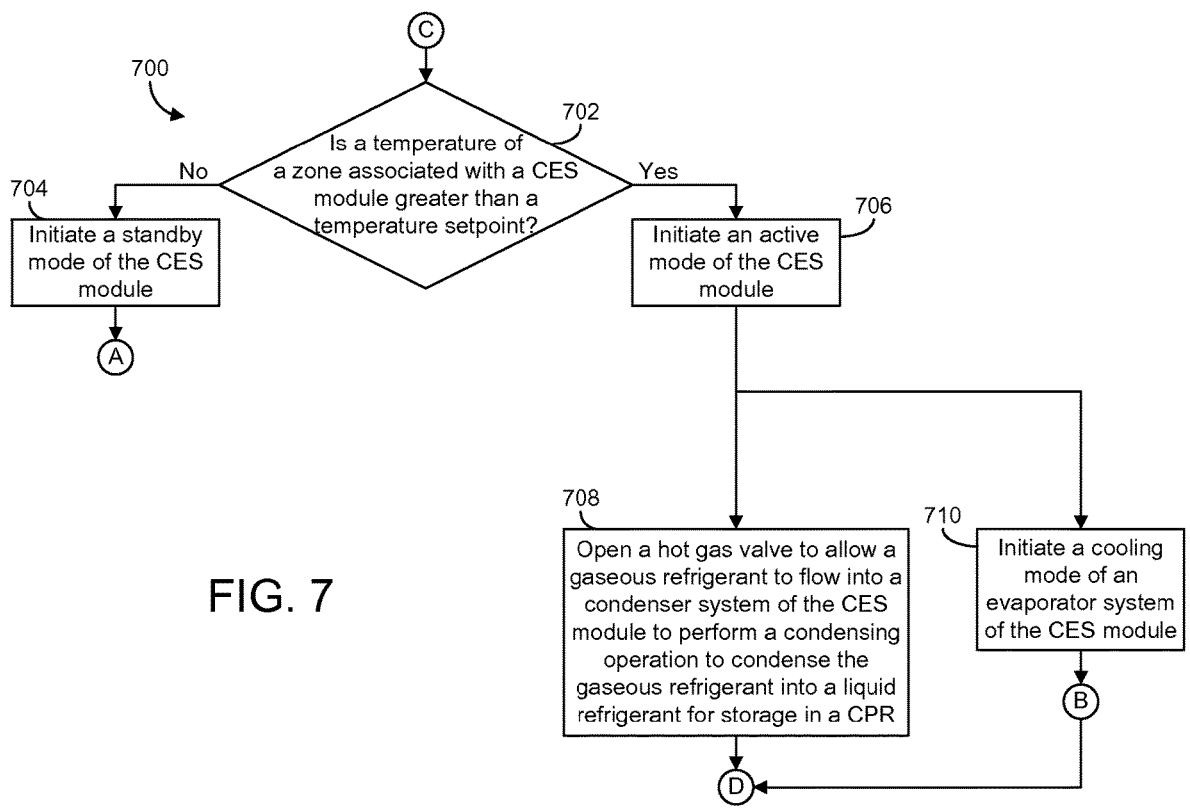
FIGS. 7-10 are flow diagrams of a method for controlling a module of a decentralized condenser evaporator system to perform a cooling operation, according to an exemplary embodiment.
Figure 8:
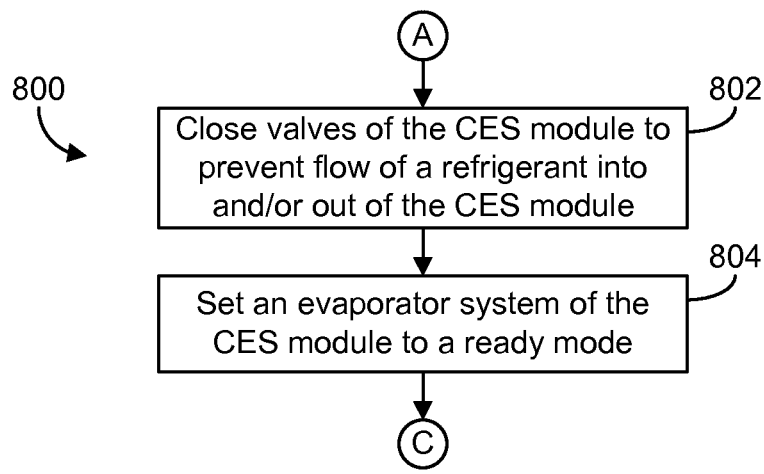

Referring to FIG. 7, at step 702, the controller 60 of the refrigeration system 10 is configured to determine whether a temperature of a zone (e.g., a temperature controlled zone, a refrigerated zone, a first zone associated with the first evaporator system 160, a second zone associated with the second evaporator system 180, etc.) associated with a CES module (e.g., the CES module 102, etc.) is greater than a temperature setpoint (e.g., a refrigeration temperature, a freezer temperature, etc.). At step 704, the controller 60 is configured to initiate a standby mode of the CES module in response to the temperature being less than the temperature setpoint. Referring to FIG. 8, the controller 60 is configured to initiate the standby mode of the CES module according to method 800. At step 802, the controller 60 is configured to close various valves (e.g., the HG condensing valve 146, the HSS valve 148, the first evaporator inlet valve 150, the second evaporator inlet valve 170, the first evaporator outlet valve 152, the second evaporator outlet valve 172, the first evaporator inlet defrost valve 154, the second evaporator inlet defrost valve 174, the first evaporator outlet defrost valve 156, the second evaporator outlet defrost valve 176, etc.) of the CES module to prevent a refrigerant from flowing into and out of the CES module. At step 804, the controller 60 is configured to set an evaporator system (e.g., the first evaporator system 160, the second evaporator system 180, etc.) of the CES module to a ready mode (e.g., in preparation for a cooling operation, etc.).

Referring back to FIG. 7, at step 706, the controller 60 is configured to initiate an active mode of the CES module in response to the temperature being greater than the temperature setpoint (e.g., for the first zone associated with the first evaporator system 160 and/or the second zone associated with the second evaporator system 180, etc.). At step 708, the controller 60 is configured to open a hot gas condensing valve (e.g., the HG condensing valve 146, etc.) to allow a gaseous refrigerant (e.g., a high pressure gaseous refrigerant, etc.) from a compressor system (e.g., the compressor system 20, etc.) to flow into a condenser system (e.g., the condenser system 140, etc.) of the CES module. The condenser system is configured to perform a condensing operation to condense at least a portion of the gaseous refrigerant into a liquid refrigerant for storage in a controlled pressure receiver (e.g., the CPR 136, etc.). At step 710, the controller 60 is configured to initiate a cooling mode of the evaporator system.

Figure 9:
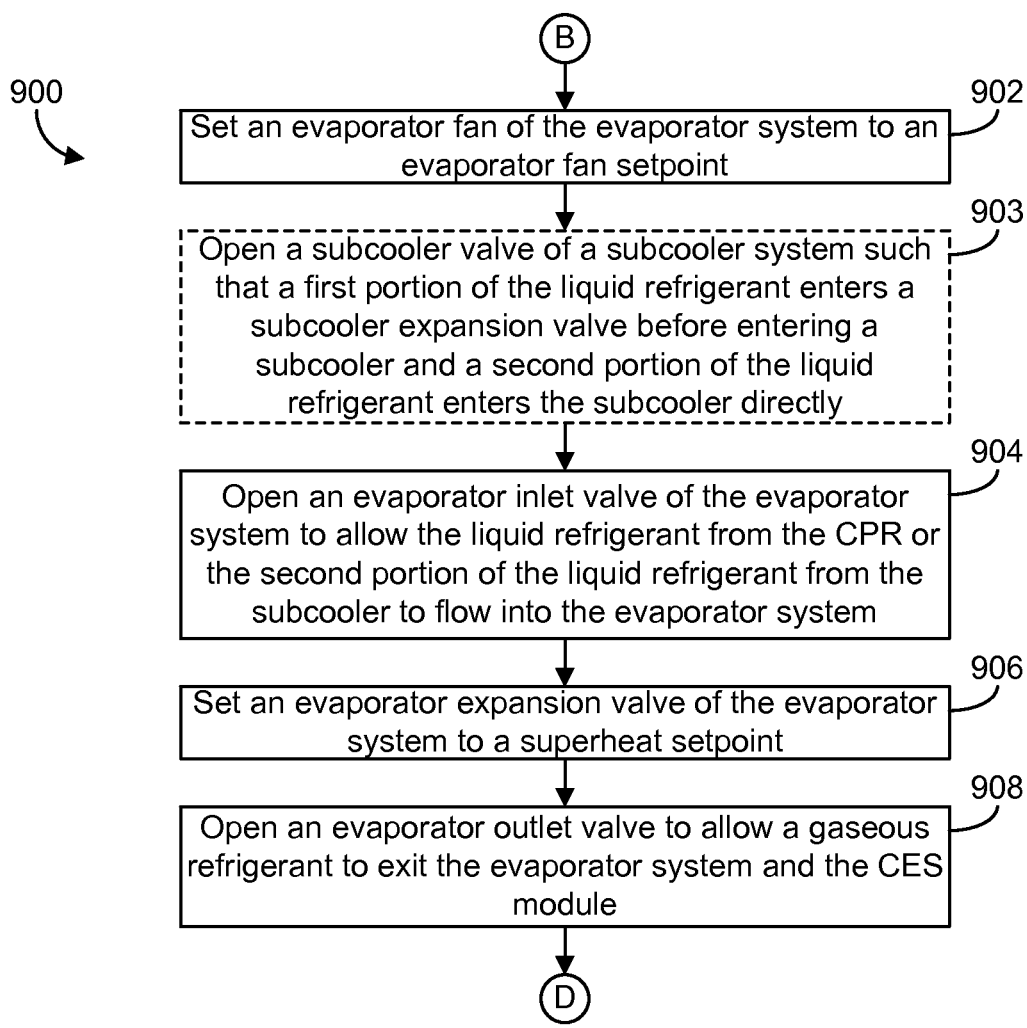

Referring to FIG. 9, the controller 60 is configured to initiate the cooling mode of the evaporator system according to method 900. At step 902, the controller 60 is configured to set an evaporator fan (e.g., the first evaporator fan 164, the second evaporator fan 184, etc.) to an evaporator fan setpoint (e.g., a desired speed, an initial speed, etc.). In embodiments where the CES modules include a subcooler system (e.g., the subcooler system 200, etc.), the controller 60 may be configured to perform step 903. At step 903, the controller 60 is configured to open a subcooler valve (e.g., the subcooler valve 226, etc.) of the subcooler system such that a first portion of the liquid refrigerant enters a subcooler expansion valve (e.g., the subcooler expansion valve 228 of the cooling circuit 220, etc.) before entering a subcooler (e.g., the subcooler 202, etc.) and a second portion of the liquid refrigerant enters the subcooler directly (e.g., via the refrigerant circuit 210, etc.). According to an exemplary embodiment, the subcooler expansion valve is configured to lower the pressure and the temperature of the first portion of the working fluid such that the first portion of the liquid refrigerant vaporizes into an evaporated gaseous refrigerant. The second portion of the liquid refrigerant and the evaporated gaseous refrigerant may both flow through the subcooler such that heat is transferred from the second portion of the liquid refrigerant to the lower temperature evaporated gaseous refrigerant (e.g., sub-cooling the second portion of the liquid refrigerant, etc.).

At step 904, the controller 60 is configured to open an evaporator inlet valve (e.g., the first evaporator inlet valve 150, the second evaporator inlet valve 170, etc.) to allow (i) the liquid refrigerant from the controlled pressure receiver (e.g., in embodiments that do not include the subcooler system 200, etc.) or (ii) the second portion of the liquid refrigerant from the subcooler (e.g., the sub-cooler liquid refrigerant, in embodiments that include the subcooler system 200, etc.) to flow into the evaporator system. At step 906, the controller 60 is configured to set an evaporator expansion valve (e.g., the first evaporator expansion valve 166, the second evaporator expansion valve 186, etc.) to a superheat setpoint (e.g., a desired superheat setpoint, an initial superheat setpoint, etc.). The evaporator system is configured to perform an evaporation operation to evaporate the liquid refrigerant into a gaseous refrigerant to cool air of a surrounding environment or zone. At step 908, the controller 60 is configured to open an evaporator outlet valve (e.g., the first evaporator outlet valve 152, the second evaporator outlet valve 172, etc.) to allow the gaseous refrigerant to exit the evaporator system and the CES module such that the gaseous refrigerant (e.g., a low pressure gaseous refrigerant, etc.) returns to the compressor system (e.g., for recompression to increase the temperature and pressure thereof, etc.).

Figure 10:
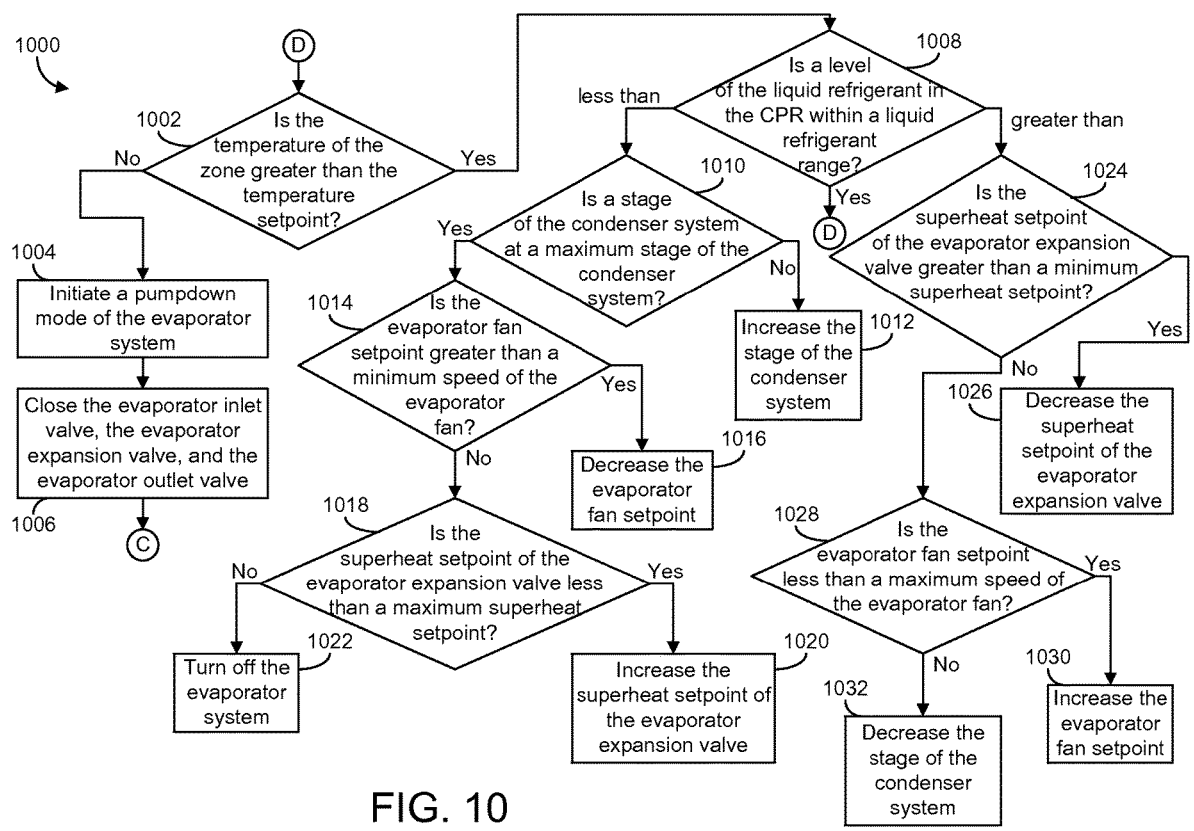

Referring now to FIG. 10, the controller 60 is configured to control operation of the CES module during the active cooling mode according to method 1000. At step 1002, the controller 60 is configured to determine whether the temperature of the zone associated with the CES module is still greater than the temperature setpoint. If the temperature is less than the temperature setpoint, the controller 60 is configured to proceed to step 1004. If the temperature is greater than the temperature setpoint, the controller 60 is configured to proceed to step 1008. At step 1004, the controller 60 is configured to initiate a pumpdown mode of the evaporator system (e.g., preparing to initiate the standby mode of the CES module, shutting of the evaporator fan, etc.). At step 1006, the controller 60 is configured to close the evaporator inlet valve, the evaporator expansion valve, and the evaporator outlet valve, and then return step 702.

At step 1008, the controller 60 is configured to determine whether a level of the liquid refrigerant in the controlled pressure receiver is within a liquid refrigerant range. If the level of the liquid refrigerant is less than the liquid refrigerant range, the controller 60 is configured to proceed to step 1010. If the level of the liquid refrigerant is greater than the liquid refrigerant range, the controller 60 is configured to proceed to step 1024. At step 1010, the controller 60 is configured determine whether the condenser system is operating at a maximum stage of the condenser system. At step 1012, the controller 60 is configured to increase the stage of the condenser system (e.g., of the condenser fan 144, of the fluid cooler 40, etc.) by a predefined increase amount in response to the current stage of the condenser system being less than the maximum stage to increase the amount of gaseous refrigerant converted to liquid refrigerant. According to one embodiment, the predefined increase amount is a percentage (e.g., a 5%, a 10%, a 25%, etc. increase, of a condenser fan speed setpoint, of a flow rate of a working cooling fluid such as glycol, etc.). According to an exemplary embodiment, increasing the stage of the condenser system increases the capacities thereof (e.g., the amount of refrigerant the condenser system is capable of converting from gas to liquid, etc.). The controller 60 may then return to step 1008. If the increase in the stage of the condenser system does not increase the level of the liquid refrigerant in the controlled pressure receiver, the controller 60 may proceed to step 1012 to increase the stage of the condenser system again and/or to step 1014.

At step 1014, the controller 60 is configured to determine whether the current evaporator fan setpoint of the evaporator fan (e.g., the speed at which the evaporator fan is currently operating, etc.) is greater than a minimum speed of the evaporator fan. At step 1016, the controller 60 is configured to decrease the evaporator fan setpoint to reduce the speed of the evaporator fan by a predefined decrease amount in response to the evaporator fan operating at a speed greater than the minimum speed of the evaporator fan to reduce the amount of liquid refrigerant converted to gaseous refrigerant by the evaporator system. According to one embodiment, the predefined decrease amount is a percentage (e.g., a 5%, a 10%, a 25%, etc. decrease of the evaporator fan speed setpoint, etc.). According to an exemplary embodiment, decreasing the evaporator fan setpoint decreases the capacity of the evaporator system (e.g., the amount of refrigerant the evaporator system is capable of converting from liquid to gas, etc.). The controller 60 may then return to step 1008. If the decrease in the evaporator fan setpoint does not increase the level of the liquid refrigerant in the controlled pressure receiver, the controller 60 may proceed to step 1012 to increase the stage of the condenser system again, to step 1016 to decrease the speed of the evaporator fan again, and/or to step 1018.

At step 1018, the controller 60 is configured to determine whether the superheat setpoint of the evaporator expansion valve is less than a maximum superheat setpoint of the evaporator expansion valve. At step 1020, the controller 60 is configured to increase the superheat setpoint of the evaporator expansion valve by a predefined increase amount in response to the superheat value of the evaporator expansion valve being less than the maximum superheat setpoint to reduce the amount of liquid refrigerant that flows into the evaporator system from the controlled pressure receiver. According to one embodiment, the predefined increase amount is a percentage (e.g., a 5%, a 10%, a 25%, etc. increase of the evaporator expansion valve superheat setpoint, etc.). The controller 60 may then return to step 1008. If the increase in the superheat setpoint of the evaporator expansion valve does not increase the level of the liquid refrigerant in the controlled pressure receiver, the controller 60 may proceed to step 1012 to increase the stage of the condenser system again, to step 1016 to decrease the speed of the evaporator fan again, to step 1020 to increase the superheat setpoint of the evaporator expansion valve again, and/or to step 1022. At step 1022, the controller 60 is configured to turn off the evaporator system (e.g., until the level of liquid refrigerant within the controlled pressure receiver is within the liquid refrigerant range, in response to the superheat setpoint reaching the maximum superheat setpoint, etc.). The controller may then return to step 1008.

At step 1024, the controller 60 is configured to determine whether the superheat setpoint of the evaporator expansion valve is greater than a minimum superheat setpoint of the evaporator expansion valve. At step 1026, the controller 60 is configured to decrease the superheat setpoint of the evaporator expansion valve by a predefined decrease amount in response to the superheat value of the evaporator expansion valve being greater than the minimum superheat setpoint to increase the amount of liquid refrigerant that flows into the evaporator system from the controlled pressure receiver. According to one embodiment, the predefined decrease amount is a percentage (e.g., a 5%, a 10%, a 25%, etc. decrease of the evaporator expansion valve superheat setpoint, etc.). The controller 60 may then return to step 1008. If the decrease in the superheat setpoint of the evaporator expansion valve does not reduce the level of the liquid refrigerant in the controlled pressure receiver, the controller 60 may proceed to step 1026 to decrease the superheat setpoint again and/or to step 1028.

At step 1028, the controller 60 is configured to determine whether the current evaporator fan setpoint of the evaporator fan (e.g., the speed at which the evaporator fan is currently operating, etc.) is less than a maximum speed of the evaporator fan. At step 1030, the controller 60 is configured to increase the evaporator fan setpoint to increase the speed of the evaporator fan by a predefined increase amount in response to the evaporator fan operating at a speed less than the maximum speed of the evaporator fan to increase the amount of liquid refrigerant converted to gaseous refrigerant by the evaporator system. According to one embodiment, the predefined increase amount is a percentage (e.g., a 5%, a 10%, a 25%, etc. increase of the evaporator fan speed setpoint, etc.). According to an exemplary embodiment, increasing the evaporator fan setpoint increases the capacity of the evaporator system (e.g., the amount of refrigerant the evaporator system is capable of converting from liquid to gas, etc.). The controller 60 may then return to step 1008. If the increase in the evaporator fan setpoint does not reduce the level of the liquid refrigerant in the controlled pressure receiver, the controller 60 may proceed to step 1026 to decrease the superheat setpoint again, proceed to step 1030 to increase the evaporator fan setpoint again, and/or to step 1032.

At step 1032, the controller 60 is configured to decrease the stage of the condenser system (e.g., decreasing the speed of the condenser fan 144, decreasing the output flow rate of the fluid cooler 40, etc.) by a predefined decrease amount (e.g., until the condenser system has to be turned off, etc.) in response to the evaporator fan setpoint reaching the maximum speed of the evaporator fan. According to one embodiment, the predefined decrease amount is a percentage (e.g., a 5%, a 10%, a 25%, etc. decrease, of a condenser fan speed setpoint, of a flow rate of a working cooling fluid such as glycol, etc.). The controller 60 may then return to step 1008. If the level of the liquid refrigerant in the controlled pressure receiver is returned to within the liquid refrigerant range, the controller 60 is configured to return to step 1002. It should be noted that the controller 60 may perform steps 1010-1022 and steps 1024-1032 is a stepped manner (e.g., wait for the threshold value to be reached before continuing to the subsequent step, etc.) or a serial manner (e.g., increase/decrease the respective parameter then move to the subsequent step and then move back to the beginning once each step has been performed, etc.).

Figure 11:
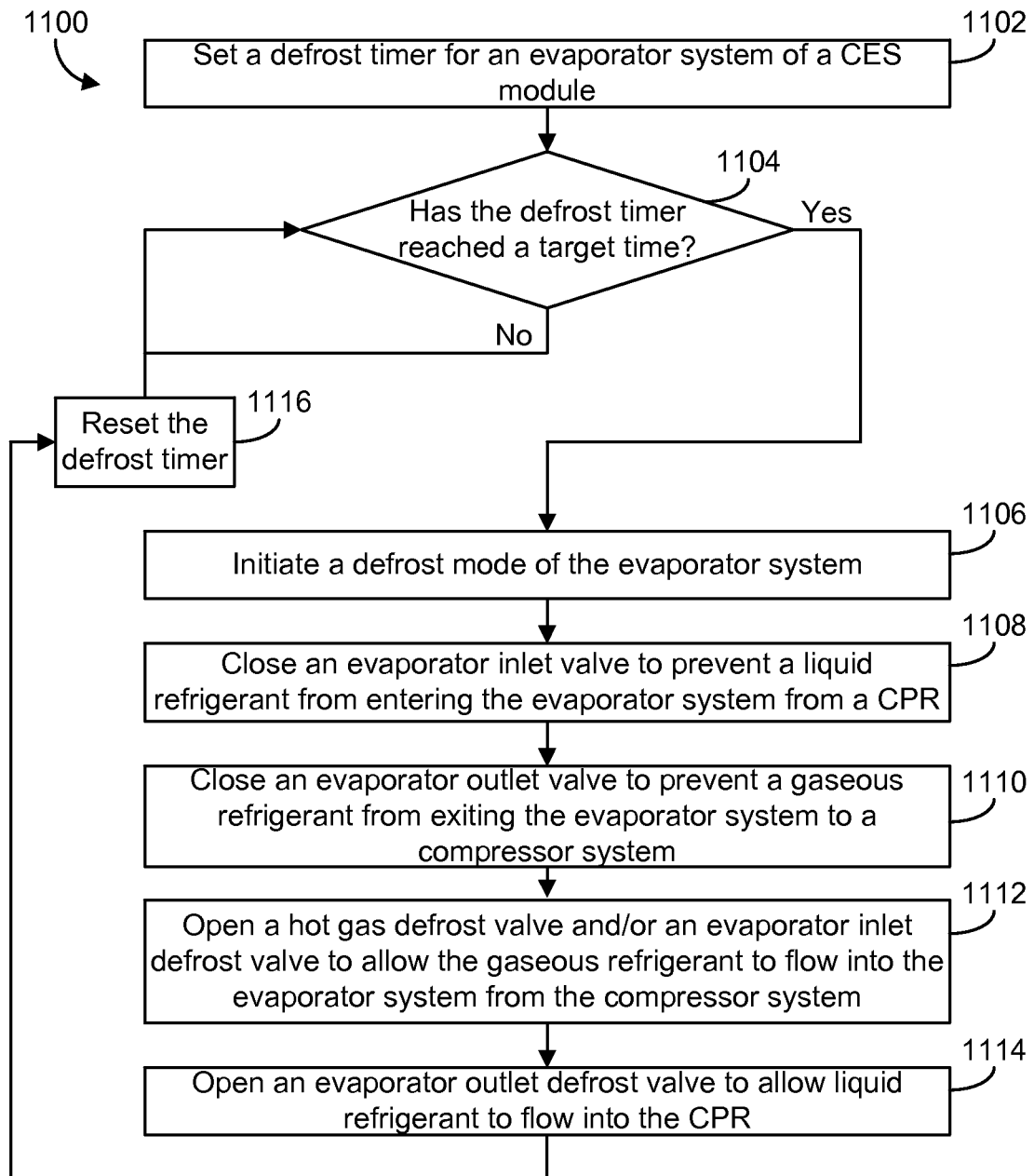
FIG. 11 is a flow diagram of a method for controlling a module of a decentralized condenser evaporator system to perform a defrost operation, according to an exemplary embodiment.

Referring now to FIG. 11, method 1100 for controlling a module of a decentralized condenser evaporator system to perform a defrost operation is shown according to an example embodiment. In one example embodiment, method 1100 may be implemented with the CES 100 and the controller 60 of FIGS. 1, 2, 5, 6, 18, and 19. As such, method 1100 may be described with regard to FIGS. 1, 2, 5, 6, 18, and 19.

At step 1102, a defrost timer is set within the controller 60 of the refrigeration system 10 for an evaporator system (e.g., the first evaporator system 160, the second evaporator system 180, etc.) of a decentralized condenser evaporator system (e.g., the CES module 102 of the CES 100, etc.). The defrost timer may be preset within the controller 60, selected by an operator of the refrigeration system 10, and/or still otherwise set. According to an exemplary embodiment, the defrost timer sets a time (e.g., six hours, four hours, twelve hours, etc.) between defrost operations of the evaporator system. In one embodiment, the time is determined based on operating time of the evaporator system between defrost operations. In other embodiments, the time is determined based on elapsed time between defrost operations of the evaporator system.

At step 1104, the controller 60 is configured to determine whether the defrost timer has reached a target time (e.g., an operating time threshold, an elapsed time threshold, etc.). If the target time has not been reached, the controller 60 waits for the target time to be reached. If the target time is reached, the controller 60 is configure to stop a cooling mode of the evaporator system (e.g., if currently operating in a cooling mode, etc.) and evaporate (e.g., boil out, etc.) any remaining liquid refrigerant that may be within the evaporator system to facilitate initiating a defrost mode of the evaporator system (step 1106).

At step 1108, the controller 60 is configured to close an evaporator inlet valve (e.g., the first evaporator inlet valve 150, the second evaporator inlet valve 170, etc.) to prevent a liquid refrigerant from entering the evaporator system from a controlled pressure receiver (e.g., the CPR 136, etc.). At step 1110, the controller 60 is configured to close an evaporator outlet valve (e.g., the first evaporator outlet valve 152, the second evaporator outlet valve 172, etc.) to prevent a gaseous refrigerant from exiting the evaporator system to a remote compressor system. At step 1112, the controller 60 is configured to control a hot gas pressure regulator (e.g., the HG defrost pressure regulator 190, etc.) and/or open an evaporator inlet defrost valve (e.g., the first evaporator inlet defrost valve 154, the second evaporator inlet defrost valve 174, etc.) to allow the gaseous refrigerant to flow into the evaporator system from the remote compressor system (e.g., the compressor system 20, etc.). At step 1114, the controller 60 is configured to open an evaporator outlet defrost valve (e.g., the first evaporator outlet defrost valve 156, the second evaporator outlet defrost valve 176, etc.) to allow liquid refrigerant (e.g., condensed from the gaseous refrigerant flowing into the evaporator system, etc.) to flow into the controlled pressure receiver. At step 1116, the controller 60 is configured to reset the defrost timer and return to step 1104 of method 1100. In some embodiments, the defrost operation of the evaporator system may additionally or alternatively be initiated based on an operator command and/or a remote command sent to the controller 60. In some embodiments, the defrost operation of the evaporator system may be initiated in-between cooling operation cycles of the evaporator system.

Figure 12:
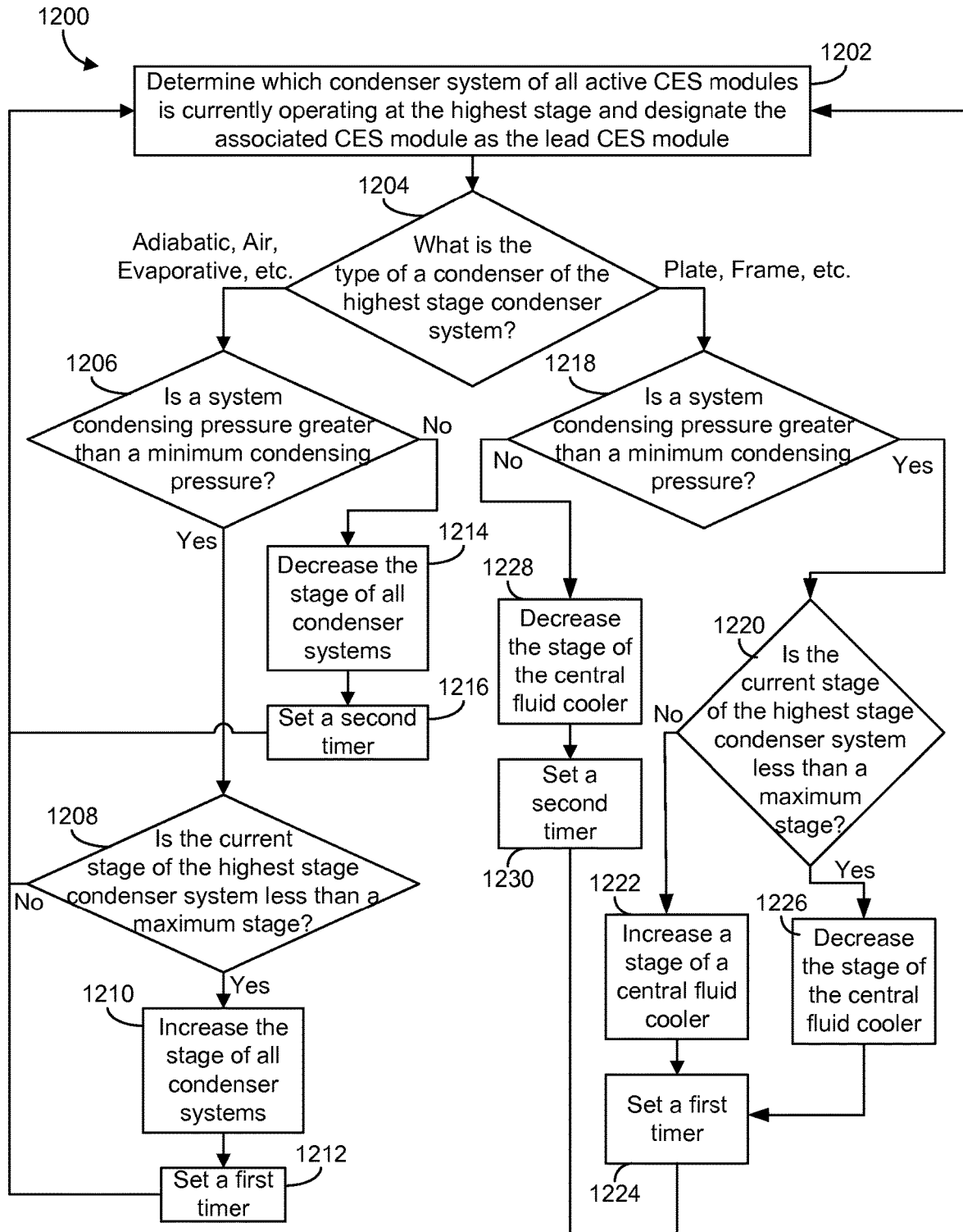
FIG. 12 is a flow diagram of a method for controlling a plurality of modules of a decentralized condenser evaporator system, according to an exemplary embodiment.

Referring now to FIG. 12, method 1200 for controlling a plurality of modules of a decentralized condenser evaporator system is shown according to an example embodiment. In one example embodiment, method 1200 may be implemented with the CES 100 and the controller 60 of FIGS. 1-2 and 6. As such, method 1200 may be described with regard to FIGS. 1-2 and 6.

At step 1202, the controller 60 of the refrigeration system 10 is configured to determine which condenser system (e.g., the condenser system 140, etc.) of all active CES modules (e.g., the CES modules 102, etc.) is currently operation at the highest stage. The controller 60 is then configured to designate the CES module associated with the highest stage condenser system as the lead CES module. At step 1204, the controller 60 is configured to determine the type of condenser included within the highest stage condenser system. If the condenser system includes an adiabatic condenser, an air-cooled condenser, an evaporative condenser, and/or another type of condenser that includes a fan, the controller 60 is configured to proceed to step 1206. If the condenser system includes a plate/frame condenser, a shell and tube condenser, a shell and plate condenser, and/or another type of condenser that does not include a fan, the controller 60 is configured to proceed to step 1218.

At step 1206, the controller 60 is configured to determine whether a system condensing pressure (e.g., the pressure of the gaseous refrigerant entering the condenser system 140, the compressor head pressure, etc.) is greater than a minimum condensing pressure. At step 1208, the controller 60 is configured to determine whether the highest stage condenser system is operating at a current stage that is less than a maximum stage of the highest stage condenser system in response to the system condensing pressure being greater than the minimum condensing pressure. At step 1210, the controller 60 is configured to increase the stage of the condenser system (e.g., increasing the speed of the condenser fan 144, etc.) of all active CES modules by a predefined increase amount in response to both the system condensing pressure being greater than the minimum condensing pressure and the current stage of the highest stage condenser system being less than the maximum stage of the highest stage condenser system. Otherwise, the controller 60 is configured to return to step 1202 in response to the current stage of the highest stage condenser system being at the maximum stage of the highest stage condenser system. According to one embodiment, the predefined increase amount is a percentage (e.g., a 5%, a 10%, a 25%, etc. increase, of a condenser fan speed setpoint, etc.). According to an exemplary embodiment, increasing the stage of the condenser system of all active CES modules by the predefined increase amount reduces the system condensing pressure (e.g., which may lead to more efficient operation of the compressor system 20, etc.). Increasing the stage of the condenser systems may increase the individual capacities thereof (e.g., the amount of refrigerant the condenser systems are capable of converting from gas to liquid, etc.), while decreasing the system condensing pressure may decrease the capacity of the condenser systems. The net result may be approximately neutral, however if not, the controller 60 may control the individual CES modules according to method 1000 to maintain the desired liquid refrigerant level in each central pressure receiver. At step 1212, the controller 60 is configured to set a first timer (e.g., ten minutes, eight minutes, six minutes, etc.) and then return to step 1202 once the time of the first timer elapses.

At step 1214, the controller 60 is configured to decrease the stage of the condenser system of all active CES modules by a predefined decrease amount in response to the system condensing pressure being less than the minimum condensing pressure. According to one embodiment, the predefined decrease amount is a percentage (e.g., a 5%, a 10%, a 25%, etc. decrease, etc.). According to an exemplary embodiment, decreasing the stage of the condenser system of all active CES modules by the predefined decrease amount increases the system condensing pressure. At step 1216, the controller 60 is configured to set a second timer (e.g., two minutes, etc.) and then return to step 1202 once the time of the second timer elapses. According to an exemplary embodiment, the second timer is less than the first timer such that the controller 60 is able to monitor changes within the refrigeration system 10 more frequently and is able to react more quickly to a low system condensing pressure (e.g., to return the refrigeration system 10 back to the minimum system condensing pressure, etc.).

At step 1218, the controller 60 is configured to determine whether a system condensing pressure (e.g., the pressure of the gaseous refrigerant exiting the condenser system 140 and/or entering the condenser system 140, the compressor head pressure, etc.) is greater than the minimum condensing pressure. At step 1220, the controller 60 is configured to determine whether the highest stage condenser system is operating at a current stage that is less than a maximum stage of the highest stage condenser system in response to the system condensing pressure being greater than the minimum condensing pressure. If the system condensing pressure is greater than the minimum condensing pressure and the current stage of the highest stage condenser system is at the maximum stage of the highest stage condenser system, the controller 60 is configured to increase the stage of a central fluid cooler (e.g., the fluid cooler 40, etc.) by the predefined increase amount (step 1222). Increasing the stage of the central fluid cooler decreases the temperature of the working cooling fluid (e.g., glycol, etc.) through the condenser system of all active CES modules (e.g., thereby increasing the capacity of the individual condenser systems that have plate/frame condensers, shell and tube condensers, shell and plate condensers, etc.) to reduce the system condensing pressure (e.g., by converting more gaseous refrigerant to liquid refrigerant, which thereby decreases the capacity of the individual condenser systems, etc.). Again, the controller 60 may control the individual CES modules according to method 1000 to maintain the desired liquid refrigerant level in each central pressure receiver. At step 1224, the controller 60 is configured to set the first timer and then return to step 1202 once the time of the first timer elapses. If the system condensing pressure is greater than the minimum condensing pressure and the current stage of the highest stage condenser system is less than the maximum stage of the highest stage condenser system, the controller 60 is configured to decrease the stage of the central fluid cooler by the predefined decrease amount (step 1226) and then proceed to step 1224.

If the system condensing pressure is less than the minimum condensing pressure, the controller 60 is configured to decrease the stage of the central fluid cooler by the predefined decrease amount (step 1228). Decreasing the stage of the central fluid cooler decreases the flow of working cooling fluid (e.g., glycol, etc.) through the condenser system of all active CES modules (e.g., decreasing the capacity of the individual condenser systems that have plate/frame condensers, shell and tube condensers, shell and plate condensers, etc.) to increase the system condensing pressure (e.g., by converting less gaseous refrigerant to liquid refrigerant, which thereby increases the capacity of the individual condenser systems, etc.). Again, the controller 60 may control the individual CES modules according to method 1000 to maintain the desired liquid refrigerant level in each central pressure receiver. At step 1230, the controller 60 is configured to set the second timer and then return to step 1202 once the time of the second timer elapses.

Referring now to FIGS. 13-17, methods 1300, 1400, 1500, 1600, and 1700 for controlling a decentralized condenser evaporator system (e.g., the CES 100, etc.) are shown according to an example embodiment. In one example embodiment, methods 1300, 1400, 1500, 1600, and 1700 may be implemented with the CES 100 and the controller 60 of FIGS. 1-6, 18, and 19. As such, methods 1300, 1400, 1500, 1600, and 1700 may be described with regard to FIGS. 1-6, 18, and 19.

Figure 13:
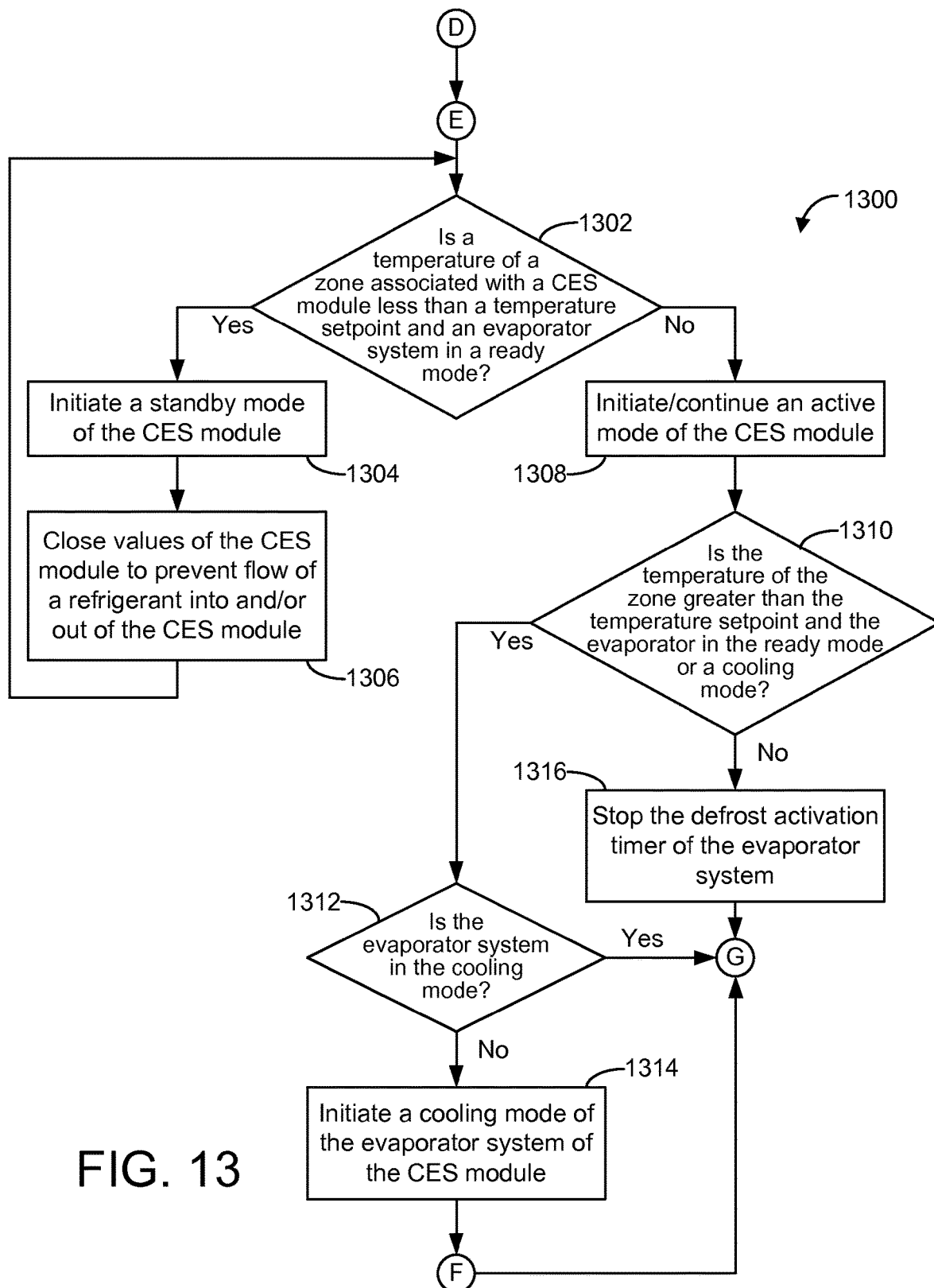
FIGS. 13-17 are flow diagrams of a method for controlling a decentralized condenser evaporator system, according to an exemplary embodiment.

Referring to FIG. 13, at step 1302 (e.g., continuing from step 908 of FIG. 9), the controller 60 of the refrigeration system 10 is configured to determine whether a temperature of a zone (e.g., a temperature controlled zone, a refrigerated zone, a first zone associated with the first evaporator system 160, a second zone associated with the second evaporator system 180, etc.) associated with a CES module (e.g., the CES module 102, etc.) is less than a temperature setpoint (e.g., a refrigeration temperature, a freezer temperature, etc.) and an evaporator system (e.g., the first evaporator system 160, the second evaporator system 180, etc.) is in a ready mode. At step 1304, the controller 60 is configured to initiate a standby mode of the CES module in response to the temperature being less than the temperature setpoint (e.g., of all associated evaporators, etc.). At step 1306, the controller 60 is configured to close various valves (e.g., the HG condensing valve 146, the HSS valve 148, the first evaporator inlet valve 150, the second evaporator inlet valve 170, the first evaporator outlet valve 152, the second evaporator outlet valve 172, the first evaporator inlet defrost valve 154, the second evaporator inlet defrost valve 174, the first evaporator outlet defrost valve 156, the second evaporator outlet defrost valve 176, etc.) of the CES module to prevent a refrigerant from flowing (i) into and out of the CES module (e.g., via the HG condensing valve 146, the HSS valve 148, etc.) and (ii) into (e.g., via the first evaporator inlet valve 150, the second evaporator inlet valve 170, the first evaporator inlet defrost valve 154, the second evaporator inlet defrost valve 174, etc.) and, after a time delay, out of (e.g., via the first evaporator outlet valve 152, the second evaporator outlet valve 172, first evaporator outlet defrost valve 156, the second evaporator outlet defrost valve 176, etc.) the evaporator system of the CES module. The associated evaporators may then be set to a ready mode. The controller 60 may then return to step 1302.

At step 1308, the controller 60 is configured to initiate and/or continue an active mode of the CES module in response to a zone temperature being greater than the temperature setpoint or an evaporator being in a defrost mode (e.g., for the first zone associated with the first evaporator system 160 and/or the second zone associated with the second evaporator system 180, etc.). At step 1310, the controller 60 is configured to determine whether the temperature of the zone is greater than the temperature setpoint and the evaporator system is in the ready mode or a cooling mode. At step 1312, the controller 60 is configured to determine whether the evaporator system is in the cooling mode. If no, the controller 60 is configured to initiate the cooling mode of the evaporator system (step 1314) and proceed to method 1400. If yes, the controller 60 is configured to proceed to method 1500. At step 1316, the controller 60 is configured to stop a defrost activation time in response to the evaporator system not being in the ready mode or the cooling mode and proceed to method 1500.

Figure 14:
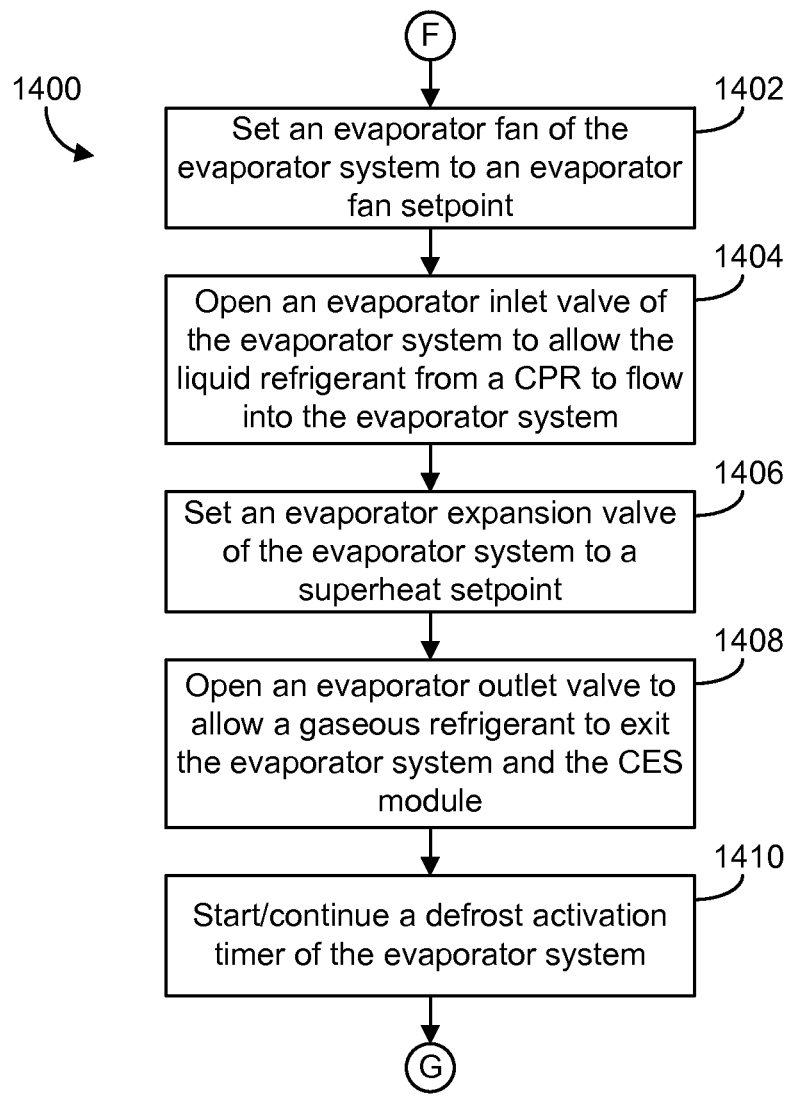

Referring to FIG. 14, the controller 60 is configured to initiate the cooling mode of the evaporator system according to method 1400. At step 1402, the controller 60 is configured to set an evaporator fan (e.g., the first evaporator fan 164, the second evaporator fan 184, etc.) to an evaporator fan setpoint (e.g., a desired speed, an initial speed, a maximum speed, etc.). At step 1404, the controller 60 is configured to open an evaporator inlet valve (e.g., the first evaporator inlet valve 150, the second evaporator inlet valve 170, etc.) to allow the liquid refrigerant from a controlled pressure receiver (e.g., the CPR 136, etc.) to flow into the evaporator system. At step 1406, the controller 60 is configured to set an evaporator expansion valve (e.g., the first evaporator expansion valve 166, the second evaporator expansion valve 186, etc.) to a superheat setpoint (e.g., a desired superheat setpoint, an initial superheat setpoint, etc.). The evaporator system is configured to perform an evaporation operation to evaporate the liquid refrigerant into a gaseous refrigerant to cool air of a surrounding environment or zone. At step 1408, the controller 60 is configured to open an evaporator outlet valve (e.g., the first evaporator outlet valve 152, the second evaporator outlet valve 172, etc.) to allow the gaseous refrigerant to exit the evaporator system and the CES module such that the gaseous refrigerant (e.g., a low pressure gaseous refrigerant, etc.) returns to the compressor system (e.g., for recompression to increase the temperature and pressure thereof, etc.). At step 1410, the controller 60 is configured to start/or continue the defrost activation timer of the evaporator system and then proceed to method 1500.

Figure 15:
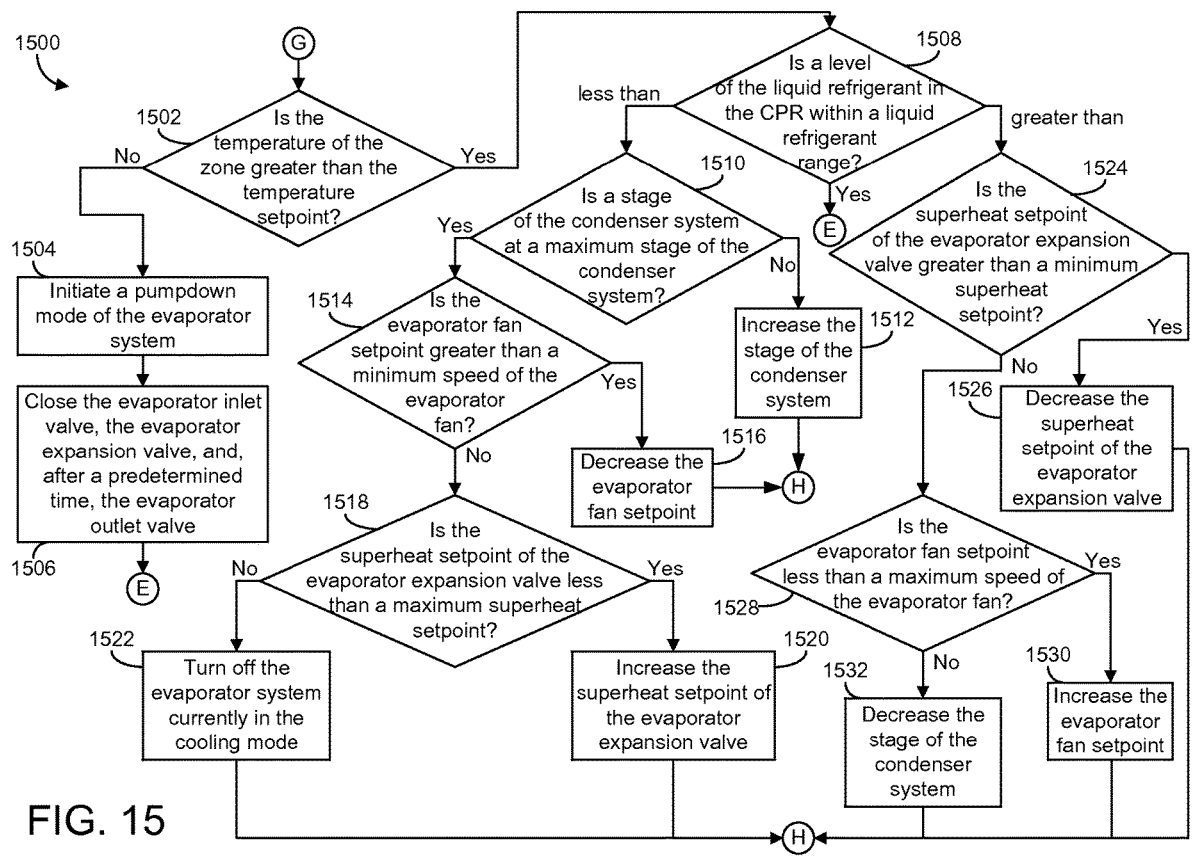

Referring now to FIG. 15, the controller 60 is configured to control operation of the CES module during the active cooling mode according to method 1500. At step 1502, the controller 60 is configured to determine whether the temperature of the zone associated with the CES module is still greater than the temperature setpoint. If the temperature is less than the temperature setpoint, the controller 60 is configured to proceed to step 1504. If the temperature is greater than the temperature setpoint, the controller 60 is configured to proceed to step 1508. At step 1504, the controller 60 is configured to initiate a pumpdown mode of the evaporator system (e.g., preparing to initiate the standby mode of the CES module, shutting of the evaporator fan, etc.). At step 1506, the controller 60 is configured to close the evaporator inlet valve, the evaporator expansion valve, and, after a predetermined time, the evaporator outlet valve, and then return step 1302.

At step 1508, the controller 60 is configured to determine whether a level of the liquid refrigerant in the controlled pressure receiver is within a liquid refrigerant level range. If the level of the liquid refrigerant is less than the liquid refrigerant level range, the controller 60 is configured to proceed to step 1510. If the level of the liquid refrigerant is greater than the liquid refrigerant level range, the controller 60 is configured to proceed to step 1524. If the refrigerant level is within the liquid refrigerant level range, the controller 60 is configured to return to step 1302. At step 1510, the controller 60 is configured determine whether a condenser system of the CES module is operating at a maximum stage of the condenser system. At step 1512, the controller 60 is configured to increase the stage of the condenser system (e.g., of the condenser fan 144, of the fluid cooler 40, etc.) by a predefined increase amount in response to the current stage of the condenser system being less than the maximum stage to increase the amount of gaseous refrigerant converted to liquid refrigerant. According to one embodiment, the predefined increase amount is a percentage (e.g., a 5%, a 10%, a 25%, etc. increase, of a condenser fan speed setpoint, of a flow rate of a working cooling fluid such as glycol, etc.). According to an exemplary embodiment, increasing the stage of the condenser system increases the capacities thereof (e.g., the amount of refrigerant the condenser system is capable of converting from gas to liquid, etc.). The controller 60 may then return to step 1508 or proceed to method 1600 (e.g., if the defrost activation timer has expired, etc.). If the increase in the stage of the condenser system does not increase the level of the liquid refrigerant in the controlled pressure receiver, the controller 60 may proceed to step 1512 to increase the stage of the condenser system again and/or to step 1514.

At step 1514, the controller 60 is configured to determine whether the current evaporator fan setpoint of the evaporator fan (e.g., the speed at which the evaporator fan is currently operating, etc.) is greater than a minimum speed of the evaporator fan. At step 1516, the controller 60 is configured to decrease the evaporator fan setpoint to reduce the speed of the evaporator fan by a predefined decrease amount in response to the evaporator fan operating at a speed greater than the minimum speed of the evaporator fan to reduce the amount of liquid refrigerant converted to gaseous refrigerant by the evaporator system. According to one embodiment, the predefined decrease amount is a percentage (e.g., a 5%, a 10%, a 25%, etc. decrease of the evaporator fan speed setpoint, etc.). According to an exemplary embodiment, decreasing the evaporator fan setpoint decreases the capacity of the evaporator system (e.g., the amount of refrigerant the evaporator system is capable of converting from liquid to gas, etc.). The controller 60 may then return to step 1508 or proceed to method 1600 (e.g., if the defrost activation timer has expired, etc.). If the decrease in the evaporator fan setpoint does not increase the level of the liquid refrigerant in the controlled pressure receiver, the controller 60 may proceed to step 1512 to increase the stage of the condenser system again, to step 1516 to decrease the speed of the evaporator fan again, and/or to step 1518.

At step 1518, the controller 60 is configured to determine whether the superheat setpoint of the evaporator expansion valve is less than a maximum superheat setpoint of the evaporator expansion valve. At step 1520, the controller 60 is configured to increase the superheat setpoint of the evaporator expansion valve by a predefined increase amount in response to the superheat value of the evaporator expansion valve being less than the maximum superheat setpoint to reduce the amount of liquid refrigerant that flows into the evaporator system from the controlled pressure receiver. According to one embodiment, the predefined increase amount is a percentage (e.g., a 5%, a 10%, a 25%, etc. increase of the evaporator expansion valve superheat setpoint, etc.). The controller 60 may then return to step 1508 or proceed to method 1600 (e.g., if the defrost activation timer has expired, etc.). If the increase in the superheat setpoint of the evaporator expansion valve does not increase the level of the liquid refrigerant in the controlled pressure receiver, the controller 60 may proceed to step 1512 to increase the stage of the condenser system again, to step 1516 to decrease the speed of the evaporator fan again, to step 1520 to increase the superheat setpoint of the evaporator expansion valve again, and/or to step 1522. At step 1522, the controller 60 is configured to turn off the evaporator system currently in the cooling mode (e.g., until the level of liquid refrigerant within the controlled pressure receiver is within the liquid refrigerant range, in response to the superheat setpoint reaching the maximum superheat setpoint, etc.). The controller 60 may then return to step 1508 or proceed to method 1600 (e.g., if the defrost activation timer has expired, etc.).

At step 1524, the controller 60 is configured to determine whether the superheat setpoint of the evaporator expansion valve is greater than a minimum superheat setpoint of the evaporator expansion valve. At step 1526, the controller 60 is configured to decrease the superheat setpoint of the evaporator expansion valve by a predefined decrease amount in response to the superheat value of the evaporator expansion valve being greater than the minimum superheat setpoint to increase the amount of liquid refrigerant that flows into the evaporator system from the controlled pressure receiver. According to one embodiment, the predefined decrease amount is a percentage (e.g., a 5%, a 10%, a 25%, etc. decrease of the evaporator expansion valve superheat setpoint, etc.). The controller 60 may then return to step 1508 or proceed to method 1600 (e.g., if the defrost activation timer has expired, etc.). If the decrease in the superheat setpoint of the evaporator expansion valve does not reduce the level of the liquid refrigerant in the controlled pressure receiver, the controller 60 may proceed to step 1526 to decrease the superheat setpoint again and/or to step 1528.

At step 1528, the controller 60 is configured to determine whether the current evaporator fan setpoint of the evaporator fan (e.g., the speed at which the evaporator fan is currently operating, etc.) is less than a maximum speed of the evaporator fan. At step 1530, the controller 60 is configured to increase the evaporator fan setpoint to increase the speed of the evaporator fan by a predefined increase amount in response to the evaporator fan operating at a speed less than the maximum speed of the evaporator fan to increase the amount of liquid refrigerant converted to gaseous refrigerant by the evaporator system. According to one embodiment, the predefined increase amount is a percentage (e.g., a 5%, a 10%, a 25%, etc. increase of the evaporator fan speed setpoint, etc.). According to an exemplary embodiment, increasing the evaporator fan setpoint increases the capacity of the evaporator system (e.g., the amount of refrigerant the evaporator system is capable of converting from liquid to gas, etc.). The controller 60 may then return to step 1508 or proceed to method 1600 (e.g., if the defrost activation timer has expired, etc.). If the increase in the evaporator fan setpoint does not reduce the level of the liquid refrigerant in the controlled pressure receiver, the controller 60 may proceed to step 1526 to decrease the superheat setpoint again, proceed to step 1530 to increase the evaporator fan setpoint again, and/or to step 1532.

At step 1532, the controller 60 is configured to decrease the stage of the condenser system (e.g., decreasing the speed of the condenser fan 144, decreasing the output flow rate of the fluid cooler 40, etc.) by a predefined decrease amount (e.g., until the condenser system has to be turned off, etc.) in response to the evaporator fan setpoint reaching the maximum speed of the evaporator fan. According to one embodiment, the predefined decrease amount is a percentage (e.g., a 5%, a 10%, a 25%, etc. decrease, of a condenser fan speed setpoint, of a flow rate of a working cooling fluid such as glycol, etc.). The controller 60 may then return to step 1508 or proceed to method 1600 (e.g., if the defrost activation timer has expired, etc.). If the level of the liquid refrigerant in the controlled pressure receiver is returned to within the desired liquid refrigerant level range, the controller 60 is configured to return to step 1302. It should be noted that the controller 60 may perform steps 1510-1522 and steps 1524-1532 is a stepped manner (e.g., wait for the threshold value to be reached before continuing to the subsequent step, etc.) or a serial manner (e.g., increase/decrease the respective parameter then move to the subsequent step and then move back to the beginning once each step has been performed, etc.).

Figure 16:
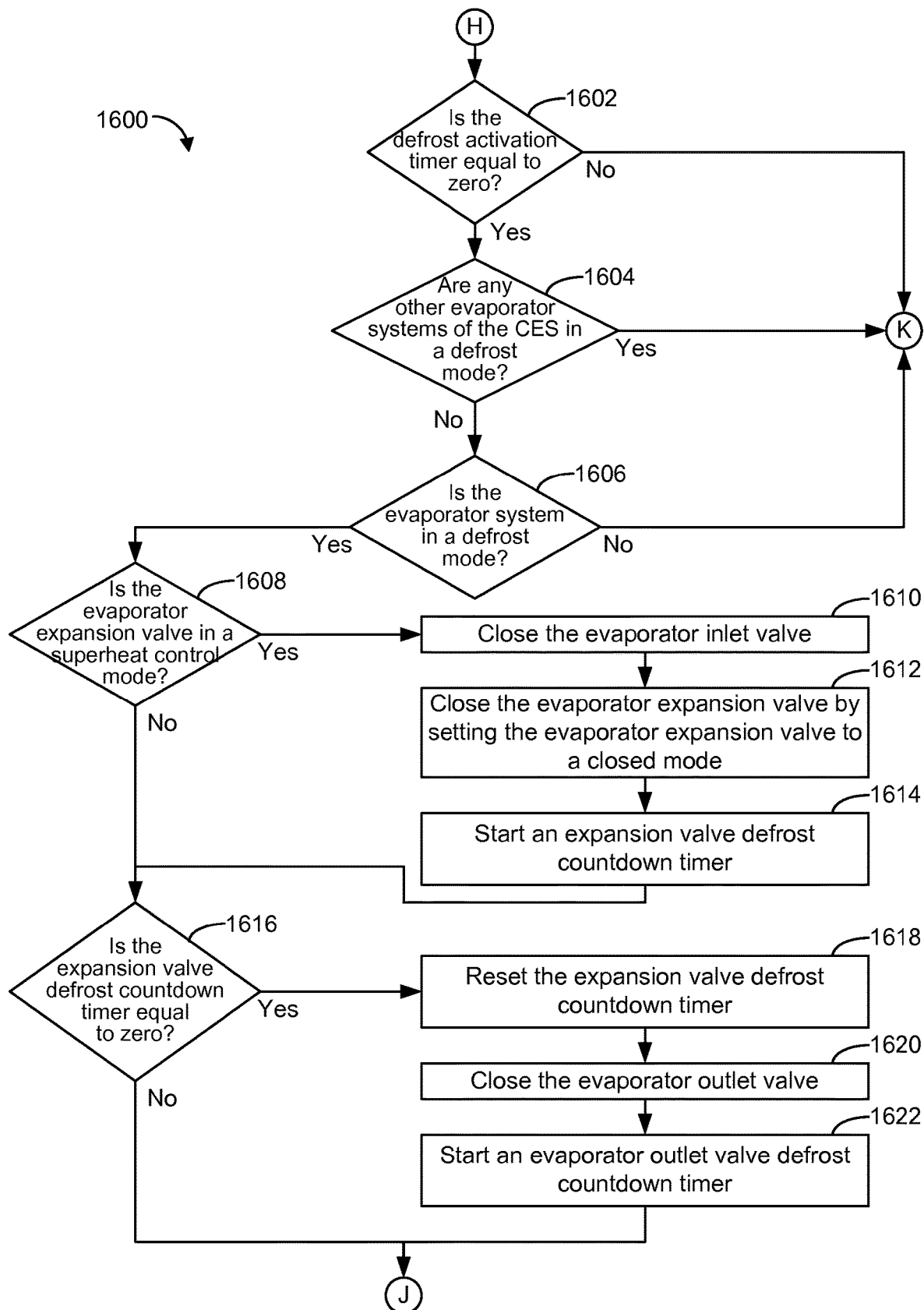
Figure 16:
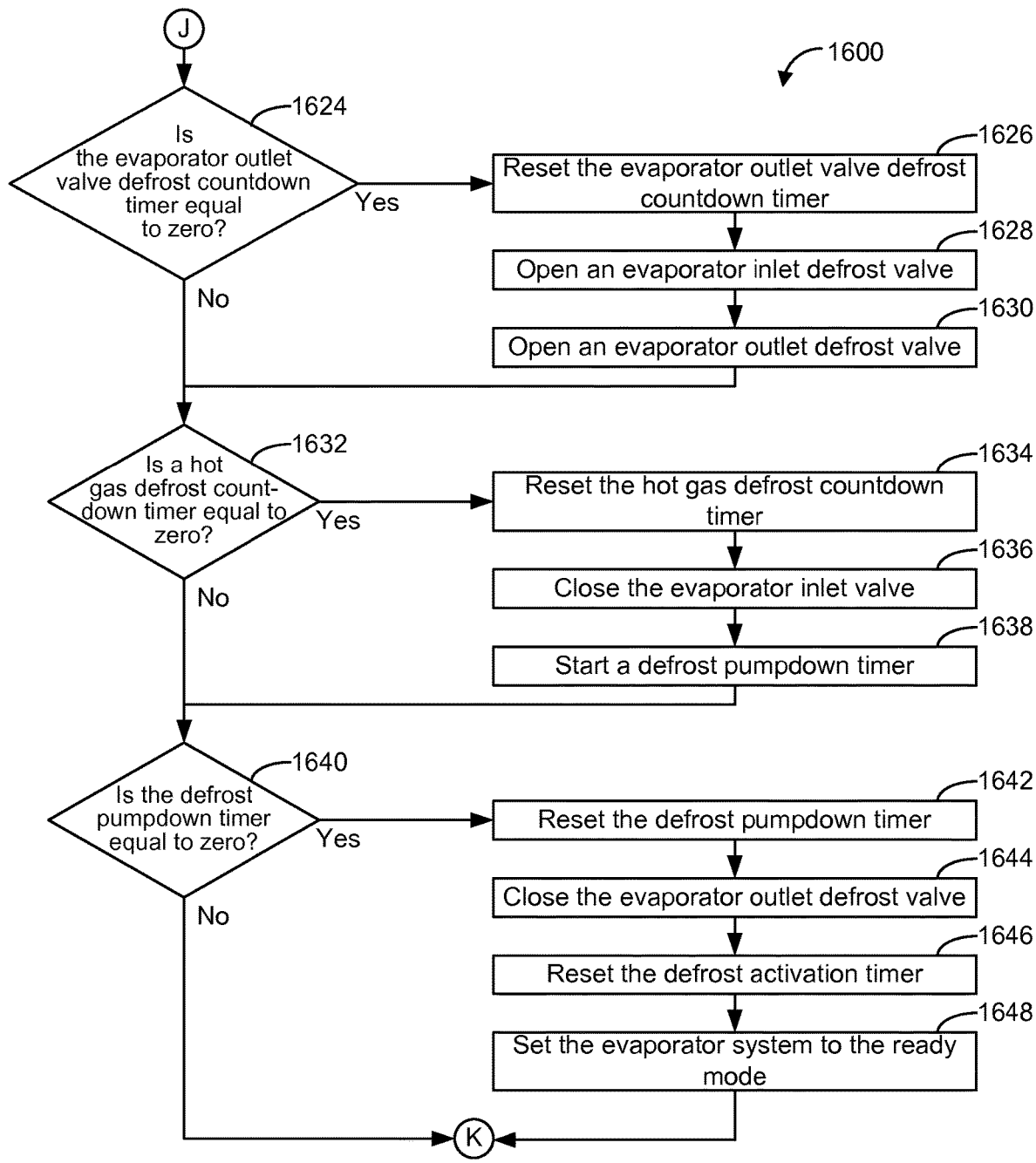

Referring now to FIG. 16, the controller 60 is configured to control operation of the CES module during a defrost mode according to method 1600. At step 1602, the controller 60 is configured to determine whether the defrost activation timer is equal to zero (e.g., expired, elapsed, etc.). By way of example, if the defrost activation time is equal to zero, the controller 60 may be configured to initiate a defrost mode of the evaporator system. At step 1604, the controller 60 is configured to determine whether any other evaporator systems of the CES are in a defrost mode. If other evaporator systems of the CES are in the defrost mode, the defrost mode of the evaporator system may not be initiated and the controller 60 may proceed to method 1700. At step 1606, the controller 60 is configured to determine whether the evaporator system should be operated in the defrost mode (e.g., the defrost activation time is zero and no other evaporator systems are currently operating in a defrost mode, etc.). If the evaporator system is in the defrost mode, the controller 60 is configured to control the evaporator system according to the defrost mode (steps 1608-1648), otherwise the controller 60 is configured to proceed to method 1700.

At step 1608, the controller 60 is configured to determine if the evaporator expansion valve is in a superheat control mode. If yes, the controller 60 is configured to close the evaporator inlet valve (step 1610), close the evaporator expansion valve by setting the evaporator expansion valve to a closed mode (step 1612), and start an expansion valve defrost countdown timer (step 1614). If no, the controller 60 is configured to proceed to step 1616. At step 1616, the controller 60 is configured to determine if the expansion valve defrost countdown timer is equal to zero. If yes, the controller 60 is configured to reset the expansion valve countdown timer (step 1618), close the evaporator outlet valve (step 1620), and start an evaporator outlet valve defrost countdown timer (step 1622). If no, the controller 60 is configured to proceed to step 1624. At step 1624, the controller 60 is configured to determine if the evaporator outlet valve defrost countdown timer is equal to zero. If yes, the controller 60 is configured to reset the evaporator outlet valve defrost countdown timer (step 1626), open an evaporator inlet defrost valve (step 1628), open an evaporator outlet defrost valve and start a hot gas defrost countdown timer (step 1630). If no, the controller 60 is configured to proceed to step 1632. At step 1632, the controller 60 is configured to determine if a hot gas defrost countdown timer is equal to zero. If yes, the controller 60 is configured to reset the hot gas defrost countdown timer (step 1634), close the evaporator inlet defrost valve (step 1636), and start a defrost pumpdown timer (step 1638). If no, the controller 60 is configured to proceed to step 1640. At step 1640, the controller 60 is configured to determine if the defrost pumpdown timer is equal to zero. If yes, the controller 60 is configured to reset the defrost pumpdown timer (step 1642), close the evaporator outlet defrost valve (step 1644), reset the defrost activation timer (step 1646), and set the evaporator system to a ready mode (step 1648). The controller 60 may then control the evaporator system according to Methods 1300, 1400, 1500, and 1700 after the defrost sequence.

Figure 17:
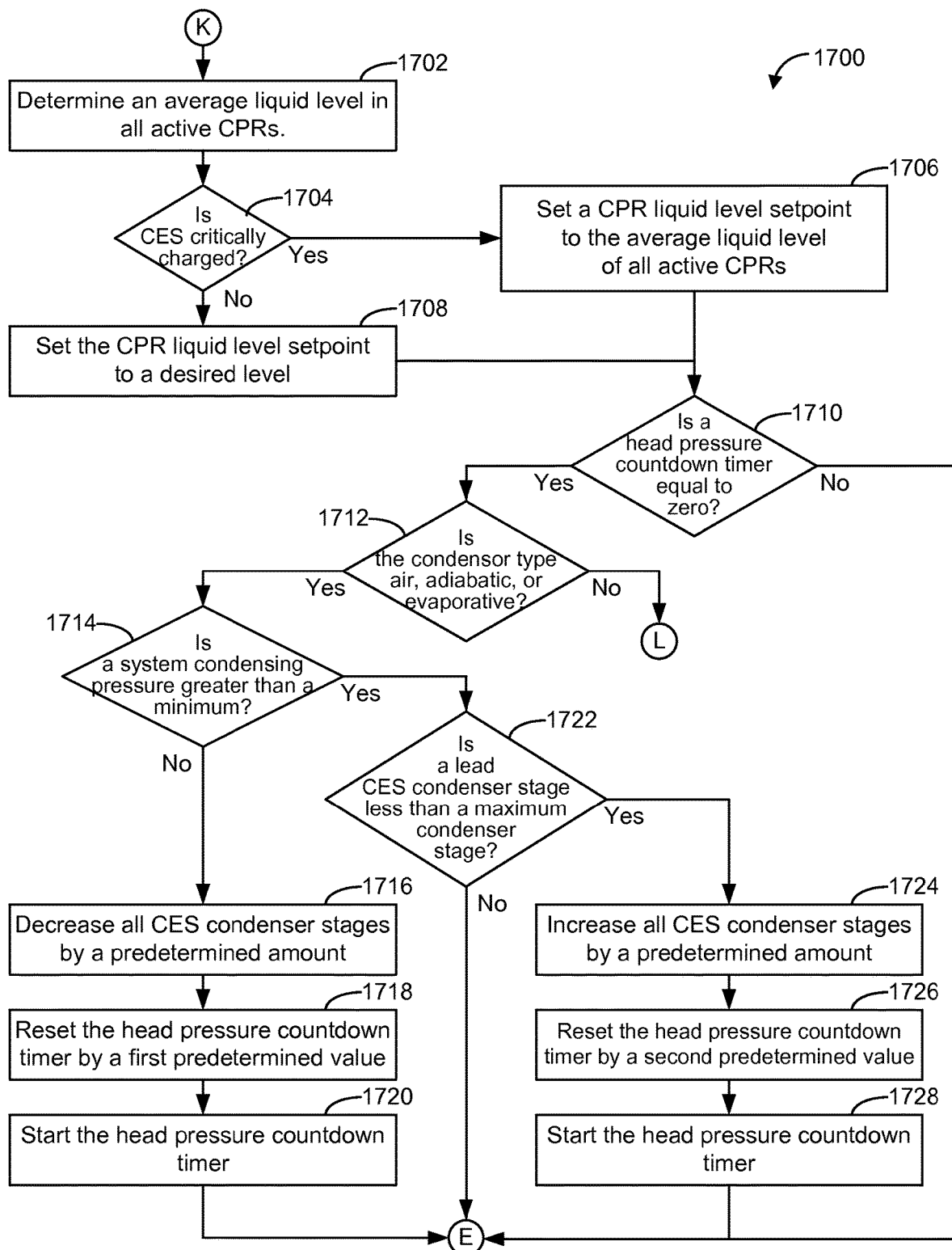
Figure 17:
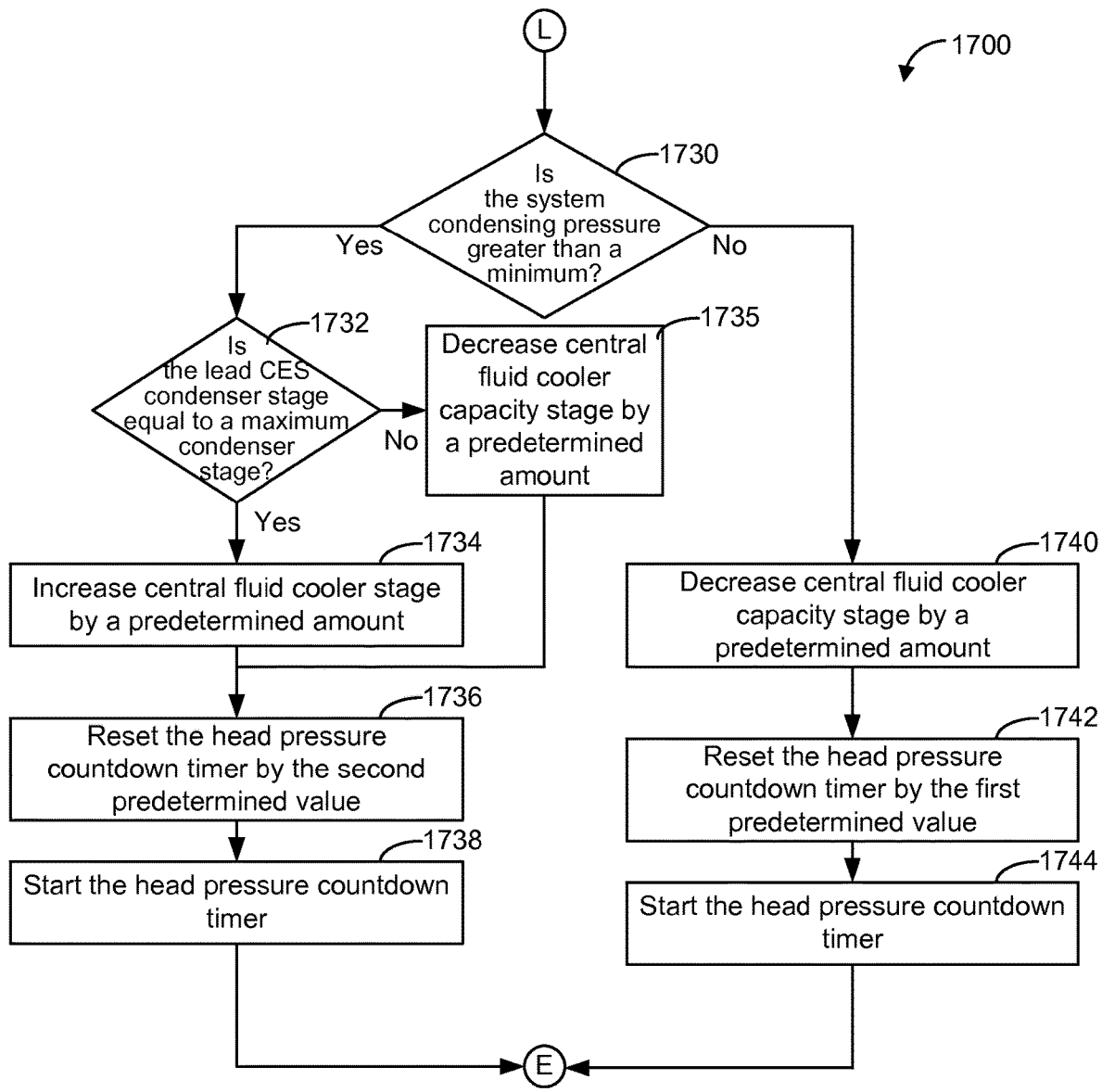

Referring now to FIG. 17, at step 1702, the controller 60 is configured to determine an average liquid level in all active CPRs. At step 1704, the controller 60 is configured to determine whether the CES is critically charged. If yes, the controller 60 is configured to set a CPR liquid level setpoint to the average liquid level of all active CPRs (step 1706). If no, the controller 60 is configured to set the CPR liquid level setpoint to a predetermined level (step 1708). At step 1710, the controller 60 is configured to determine if a head pressure countdown timer is equal to zero. If no, the controller 60 is configured to return to step 1302. If yes, the controller 60 is configured to determine if the condenser type is an air, an adiabatic, or an evaporative condenser (step 1712). If yes, the controller 60 is configured to proceed to step 1714. If no, the controller 60 is configured to proceed to step 1730.

At step 1714, the controller 60 is configured to determine whether a system condensing pressure is greater than a minimum condensing pressure. At step 1716, the controller 60 is configured to decrease the stage of all condenser systems of the CES by a predetermined amount in response to the system condensing pressure being less than the minimum. At step 1718, the controller 60 is configured to reset the head pressure countdown timer by a first predetermined value (e.g., two minutes, a relatively shorter time, etc.). At step 1720, the controller 60 is configured to start the head pressure countdown timer and then return to step 1302. At step 1722, the controller 60 is configured to determine if the stage of a lead condenser of the CES (e.g., the condenser operating at the highest stage, etc.) is less than a maximum stage of the lead condenser in response to the system condensing pressure being greater than the minimum. If no, the controller 60 is configured to return to step 1302. If yes, the controller 60 is configured to increase the stage of all condenser systems of the CES by a predetermined amount (step 1724). At step 1726, the controller 60 is configured to reset the head pressure countdown timer by a second predetermined value (e.g., ten minutes, a relatively longer time, etc.). At step 1728, the controller 60 is configured to start the head pressure countdown timer and then return to step 1302.

At step 1730, the controller 60 is configured to determine whether a system condensing pressure is greater than a minimum condensing pressure. At step 1732, the controller 60 is configured to determine if the stage of the lead condenser of the CES is equal to a maximum stage of the lead condenser in response to the system condensing pressure being greater than the minimum. If yes, the controller 60 is configured to increase a stage of a central fluid cooler by a predetermined amount (step 1734). If no, the controller 60 is configured to decrease the stage of the central fluid cooler by a predetermined amount (step 1735). At step 1736, the controller 60 is configured to reset the head pressure countdown timer by the second predetermined value (e.g., ten minutes, relatively longer time, etc.). At step 1738, the controller 60 is configured to start the head pressure countdown timer and then return to step 1302. At step 1740, the controller 60 is configured to decrease the stage of the central fluid cooler by a predetermined amount in response to the system condensing pressure being less than the minimum. At step 1742, the controller 60 is configured to reset the head pressure countdown timer by the first predetermined value (e.g., two minutes, a relatively shorter time, etc.). At step 1744, the controller 60 is configured to start the head pressure countdown timer and then return to step 1302.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z. Thus, such conjunctive language is not generally intended to imply that certain embodiments require at least one of X, at least one of Y, and at least one of Z to each be present.

The invention claimed is:

1. A decentralized condenser evaporator system comprising:
 a plurality of condenser evaporator modules configured to fluidly couple to a centralized compressor system, each of the plurality of condenser evaporator modules comprising:
  a condenser system positioned to receive a compressed gaseous refrigerant from the centralized compressor system, the condenser system configured to condense the compressed gaseous refrigerant into a liquid refrigerant;
  a controlled pressure receiver positioned to receive and store the liquid refrigerant condensed by the condenser system;
  a subcooler system positioned to receive the liquid refrigerant from the controlled pressure receiver, the subcooler system configured to sub-cool the liquid refrigerant exiting the controlled pressure receiver into a sub-cooled liquid refrigerant;
  an evaporator system positioned to receive the sub-cooled liquid refrigerant from the subcooler system, the evaporator system configured to facilitate providing a cooling operation to a cooling zone associated with the evaporator system through evaporation of the sub-cooled liquid refrigerant flowing through the evaporator system into an evaporated gaseous refrigerant which is returned to the centralized compressor system; and
  a compressor return conduit extending from the controlled pressure receiver, wherein the compressor return conduit is positioned to direct gaseous refrigerant to the centralized compressor system that accumulates within the controlled pressure receiver as a result of receiving the liquid refrigerant directly from the condenser system such that the gaseous refrigerant within the controlled pressure receiver bypasses the subcooler system and the evaporator system.

2. The decentralized condenser evaporator system of claim 1, wherein the subcooler system is configured to sub-cool the liquid refrigerant exiting the controlled pressure receiver to prevent a portion of the liquid refrigerant from flashing into and entering the evaporator system in a gaseous state.

3. The decentralized condenser evaporator system of claim 1, wherein the subcooler system is configured to operate in (i) an active mode while the evaporator system is providing the cooling operation and (ii) an inactive mode while the evaporator system is not providing the cooling operation.

4. The decentralized condenser evaporator system of claim 1, wherein the subcooler system is at least one of (i) positioned proximate the controlled pressure receiver and (ii) elevated relative to the evaporator system.

5. The decentralized condenser evaporator system of claim 1, wherein the subcooler system includes:
  a subcooler having a first inlet, a first outlet, a second inlet, and a second outlet;
  a first circuit having:
    a first inlet conduit coupled to the first inlet of the subcooler and the controlled pressure receiver; and
    a first outlet conduit coupled to the first outlet of the subcooler and the evaporator system; and
  a second circuit having:
    a second inlet conduit coupled to the second inlet of the subcooler and the controlled pressure receiver;
    a subcooler valve positioned along the second inlet conduit;
    a subcooler expansion valve positioned along the second inlet conduit between the subcooler valve and the second inlet; and
    a second outlet conduit coupled to the second outlet of the subcooler and configured to couple to the centralized compressor system.

6. The decentralized condenser evaporator system of claim 5, wherein the first circuit is configured to receive a first portion of the liquid refrigerant and the second circuit is configured to receive a second portion of the liquid refrigerant.

7. The decentralized condenser evaporator system of claim 6, wherein the subcooler expansion valve is configured to lower a pressure and a temperature of the second portion of the liquid refrigerant such that the second portion of the liquid refrigerant evaporates into a second evaporated gaseous refrigerant, and wherein the second evaporated gaseous refrigerant flows through the second circuit to sub-cool the first portion of the liquid refrigerant flowing through the first circuit such that the sub-cooled liquid refrigerant exits the subcooler within the first outlet conduit.

8. The decentralized condenser evaporator system of claim 7, wherein the second outlet conduit is configured to return the second evaporated gaseous refrigerant to the centralized compressor system.

9. The decentralized condenser evaporator system of claim 6, wherein the subcooler valve is open while the evaporator system is providing the cooling operation and closed while the evaporator system is not providing the cooling operation such that the subcooler does not receive the second portion of the liquid refrigerant when the subcooler valve is closed.

10. The decentralized condenser evaporator system of claim 1, wherein the subcooler system includes a plurality of subcoolers arranged in parallel upstream of the evaporator system.

11. The decentralized condenser evaporator system of claim 1, further comprising a controller configured to control at least one of the condenser system, the subcooler system, and the evaporator system to at least one of (i) maintain a desired level of the liquid refrigerant within the controlled pressure receiver and (ii) provide a desired amount of cooling to the cooling zone.

12. The decentralized condenser evaporator system of claim 1, wherein the evaporator system includes (i) an evaporator conduit positioned to receive the sub-cooled liquid refrigerant from the subcooler system, (ii) a valve positioned between the subcooler system and the evaporator conduit, the valve configured to facilitate modulating an amount of the sub-cooled liquid refrigerant that flows into the evaporator conduit from the subcooler system, and (iii) a fan positioned to facilitate providing an airflow across the evaporator conduit to cool the airflow to provide the cooling operation to the cooling zone associated with the evaporator system.

13. The decentralized condenser evaporator system of claim 1, wherein the evaporator system includes a plurality of evaporator systems arranged in parallel with one another.

14. The decentralized condenser evaporator system of claim 1, wherein the condenser system is configured to receive a cooled working fluid from a centralized fluid cooler to facilitate condensing the compressed gaseous refrigerant into the liquid refrigerant.

15. The decentralized condenser evaporator system of claim 1, wherein the condenser system includes (i) a condenser conduit positioned to receive the compressed gaseous refrigerant from the centralized compressor system and (ii) a fan positioned to facilitate providing an airflow across the condenser conduit to condense at least a portion of the compressed gaseous refrigerant flowing through the condenser conduit provided by the centralized compressor system into the liquid refrigerant.

16. The decentralized condenser evaporator system of claim 3, further comprising a controller configured to operate the subcooler system in the active mode while the evaporator system is providing the cooling operation and in the inactive mode while the evaporator system is not providing the cooling operation.

* * * * *